United States Patent
Araki

(10) Patent No.: US 12,131,089 B2
(45) Date of Patent: Oct. 29, 2024

(54) DISPLAY CONTROL SYSTEM, DISPLAY CONTROL METHOD, AND PROGRAM INCLUDING CONTROLLING THE DISPLAY OF VIDEO CONTENT

(71) Applicant: Sharp NEC Display Solutions, Ltd., Tokyo (JP)

(72) Inventor: Ryoichi Araki, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/911,587

(22) PCT Filed: Mar. 19, 2020

(86) PCT No.: PCT/JP2020/012461
§ 371 (c)(1),
(2) Date: Sep. 14, 2022

(87) PCT Pub. No.: WO2021/186717
PCT Pub. Date: Sep. 23, 2021

(65) Prior Publication Data
US 2023/0359420 A1  Nov. 9, 2023

(51) Int. Cl.
G06F 3/14  (2006.01)
G06V 10/764  (2022.01)

(52) U.S. Cl.
CPC ............ *G06F 3/14* (2013.01); *G06V 10/764* (2022.01); *G06V 2201/07* (2022.01)

(58) Field of Classification Search
None
See application file for complete search history.

(56) References Cited

U.S. PATENT DOCUMENTS

2007/0189585 A1* 8/2007 Sukegawa ............... G07C 9/37
382/118
2011/0150283 A1   6/2011 Kim et al.
(Continued)

FOREIGN PATENT DOCUMENTS

CN   101263027 A    9/2008
CN   102484692 A    5/2011
(Continued)

OTHER PUBLICATIONS

Kaneko Electronic Display Device Jan. 17, 2013 Espacenet Translation (Year: 2013).*
(Continued)

*Primary Examiner* — Amr A Awad
*Assistant Examiner* — Donna V Bocar
(74) *Attorney, Agent, or Firm* — MCGINN I.P. LAW GROUP, PLLC

(57) ABSTRACT

A display control system includes a personal attribute information acquirer, a content specifier, and a display output. The personal attribute information acquirer acquires personal attribute information indicating an attribute of people present in an area including a vicinity of a display area for displaying video content based on a captured image of the area. The content specifier specifies target video content items, which are video content items to be displayed on the display area, based on the personal attribute information. The display output sets a plurality of screen areas in the display area based on the number of the target video content items and allocates and outputs the target video content items to the plurality of screen areas.

17 Claims, 17 Drawing Sheets

(56) References Cited

U.S. PATENT DOCUMENTS

| | | | | |
|---|---|---|---|---|
| 2017/0169794 | A1* | 6/2017 | Nagano | G09G 5/02 |
| 2020/0097238 | A1* | 3/2020 | Kawase | H04N 1/00506 |

FOREIGN PATENT DOCUMENTS

| | | | |
|---|---|---|---|
| CN | 102087846 | A | 6/2011 |
| CN | 103201710 | A | 7/2013 |
| CN | 105373768 | A | 3/2016 |
| CN | 106233742 | A | 12/2016 |
| JP | 2009-139857 | A | 6/2009 |
| JP | 2012-181328 | A | 9/2012 |
| JP | 2013-011669 | A | 1/2013 |
| JP | 2017-116693 | A | 6/2017 |
| JP | 2018-106739 | A | 7/2018 |
| JP | 2019-066700 | A | 4/2019 |
| JP | 2019-159156 | A | 9/2019 |

OTHER PUBLICATIONS

Taki Control Method, Information Processing Apparatus, and Control Program Apr. 25, 2019 Espacenet translation (Year: 2019).*

Takahata Display Controller and Control Program Sep. 19, 2019 Espacenet translation (Year: 2019).*

International Search Report (ISR) (PCT Form PCT/ISA/210), in PCT/JP2020/012461, dated Jun. 23, 2020.

Chinese Office Action, dated Jun. 29, 2023, in Application No. 202080098587.8 and partial translation thereof.

Chinese Office Action 202080098587.8 issued on Dec. 22, 2023 with English translation thereof of Search Report only.

* cited by examiner

| ID | CONTENT DATA | TARGET | PRIORITY | CONTENT FLAG |
|---|---|---|---|---|
| 0001 | ...... | FEMALE IN HER TWENTIES | 1 | 0 |
| 0002 | ...... | MALE IN HIS THIRTIES | 2 | 0 |
| 0003 | ...... | MALE IN HIS FORTIES | 3 | 0 |
| 0004 | ...... | — | — | 1 |
| ⋮ | ⋮ | ⋮ | ⋮ | ⋮ |

FIG. 8
(a) WHEN NUMBER OF TARGET CONTENT ITEMS IS 1
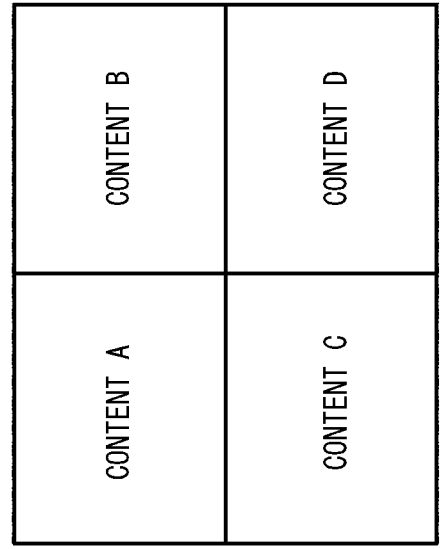
(b) WHEN NUMBER OF TARGET CONTENT ITEMS IS 2
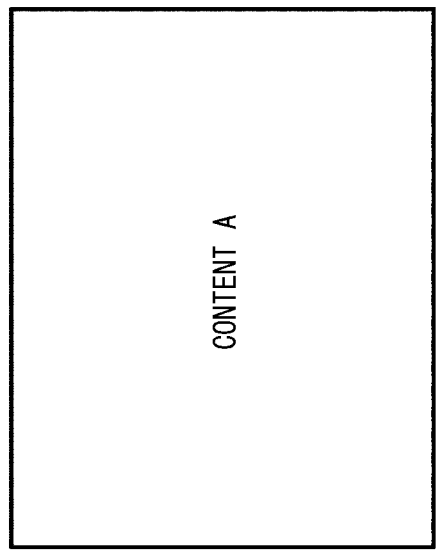
(c) WHEN NUMBER OF TARGET CONTENT ITEMS IS 3
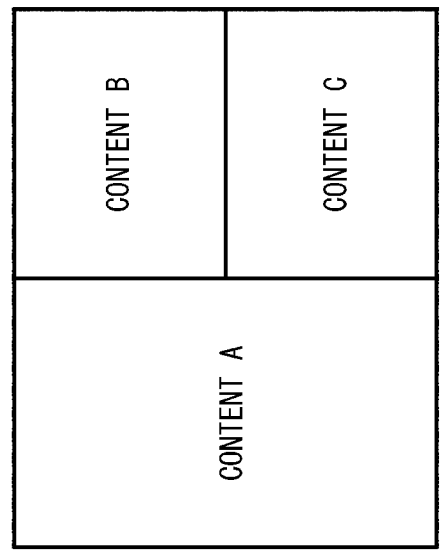
(d) WHEN NUMBER OF TARGET CONTENT ITEMS IS 4

DISPLAY CONTROL SYSTEM, DISPLAY CONTROL METHOD, AND PROGRAM INCLUDING CONTROLLING THE DISPLAY OF VIDEO CONTENT

TECHNICAL FIELD

Some aspects of the present invention relate to a system for controlling the display of video content, a method for controlling the display of video content, and a program.

BACKGROUND ART

A digital signage system that distributes various video content items (for example, advertisements) using a video display device such as a display or a projector is used in various places. For example, there is a system that analyzes an image (a frame) captured by an image capturing device set in the vicinity of a video display device to determine attributes such as the age and gender of people in the vicinity of the video display device and distributes a specific advertisement (targeted advertising) according to the determination result of the attributes. Examples of techniques relating to such a system are disclosed, for example, in Patent Literatures 1 to 3 below.

Patent Literature 1 discloses a technique for controlling the display position of each content item on a display of a digital signage based on the correspondence between priority levels regarding the classes of content items determined based on the attributes of people detected in the vicinity of the digital signage and priority levels regarding a plurality of preset areas on the display of the digital signage. Patent Literature 2 discloses a technique for acquiring an attribute of a person located in front of a signage device based on the result of face recognition processing using image data of the person and displaying a content item according to the acquired attribute. Patent Literature 3 discloses a method in which, when a plurality of people and a plurality of attributes have been recognized from a frame imaged by an image capturing device, the people are classified into one or a plurality of groups and an advertisement that targets each group is displayed based on evaluation points for each group that have been calculated from the attributes or the number of people.

CITATION LIST

Patent Literatures

[Patent Literature 1]
Japanese Unexamined Patent Application, First Publication No 2019-159156
[Patent Literature 2]
Japanese Unexamined Patent Application, First Publication No 2017-116693
[Patent Literature 3]
Japanese Unexamined Patent Application, First Publication No 2019-066700

SUMMARY OF INVENTION

Technical Problem

According to targeted advertising of the related art, when a plurality of people and a plurality of attributes have been recognized from a frame captured by an image capturing device, a plurality of targeted advertisements suitable for the plurality of attributes are displayed in an order based on a predetermined rule. In this case, people who are the target of the second or subsequent targeted advertisement that will be displayed may move away from the video display device before the second or subsequent targeted advertisement is displayed and thus there is a problem that the intended effects of the second or subsequent targeted advertisement may not be as expected. Advertising that targets a group based on evaluation points of the group has a problem that the effects of targeted advertising may not be as expected for other groups that are not being targeted. Also, there is a problem that the targeted advertising effects of an advertisement that targets a group are lower than those of an advertisement targeted for each individual's attributes because an advertisement that targets a group is an advertisement eclectically selected based on a plurality of attributes of a plurality of people in a group.

The some aspects of the present invention have been made in view of the above problems. It is an object of the some aspects of the present invention to provide a technique for preventing the intended effects of each video content item from being impaired when a plurality of video content items with different targets are displayed.

Solution to Problem

A display control system of one aspect of the present invention includes a personal attribute information acquirer configured to acquire personal attribute information indicating an attribute of people present in an area including a vicinity of a display area for displaying video content based on a captured image of the area, a content specifier configured to specify target video content items, which are video content items to be displayed on the display area, based on the personal attribute information, and a display output configured to set a plurality of screen areas in the display area based on the number of the target video content items and allocate the target video content items to the plurality of screen areas and output the target video content items.

A display control method of one aspect of the present invention includes, by a computer, acquiring personal attribute information indicating an attribute of people present in an area including a vicinity of a display area for displaying video content based on a captured image of the area, specifying target video content items, which are video content items to be displayed on the display area, based on the personal attribute information, and setting a plurality of screen areas in the display area based on the number of the target video content items and allocating the target video content items to the plurality of screen areas and outputting the target video content items.

A program of one aspect of the present invention causes a computer to function as a personal attribute information acquirer configured to acquire personal attribute information indicating an attribute of people present in an area including a vicinity of a display area for displaying video content based on a captured image of the area, a content specifier configured to specify target video content items, which are video content items to be displayed on the display area, based on the personal attribute information, and a display output configured to set a plurality of screen areas in the display area based on the number of the target video content items and allocate the target video content items to the plurality of screen areas and output the target video content items.

Advantageous Effects of Invention

The some aspects of the present invention provide a technique for preventing the intended effects of each video content item from being impaired when a plurality of video content items with different targets are displayed.

BRIEF DESCRIPTION OF DRAWINGS

FIG. 5 is a diagram showing an example of information stored in a content storage.

FIG. 8 is a diagram showing an example of setting screen areas by a display output.

DESCRIPTION OF EMBODIMENTS

Figure 1:
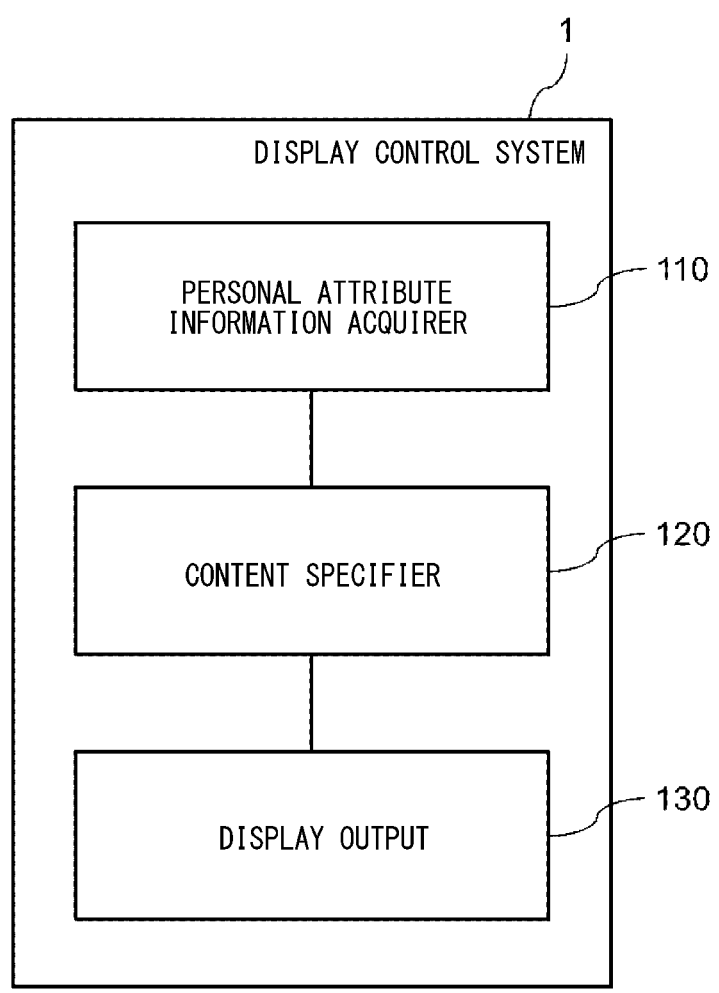
FIG. 1 is a diagram illustrating a functional configuration of a display control system according to a first embodiment.

Hereinafter, embodiments of the present invention will be described with reference to the drawings. In all drawings, similar components are denoted by the same reference numerals and description thereof will be omitted as appropriate. In each block diagram, each block represents the component of a functional unit rather than the component of a hardware unit unless otherwise specified. The direction of each arrow in the drawings is intended to make the flow of information easy to understand and does not limit the direction of communication (to one-way communication/two-way communication) unless otherwise specified.

First Embodiment

<Exemplary Functional Configuration>

FIG. 1 is a diagram illustrating a functional configuration of a display control system 1 according to a first embodiment. As shown in FIG. 1, the display control system 1 of the present embodiment includes a personal attribute information acquirer 110, a content specifier 120, and a display output 130.

The personal attribute information acquirer 110 acquires information indicating attributes of people present in a target area including the vicinity of a display area for displaying video content (hereinafter also referred to as "personal attribute information") based on a captured image of the target area. Here, the video content may be a moving image or a still image. "Video content" in the present specification may include arbitrary content such as an advertisement and news information. The "personal attributes" include at least one of an age-related attribute, a gender-related attribute, an attribute relating to a physical characteristic (such as physique), an attribute relating to clothing or presence or absence of belongings (such as a bag), or an attribute that can be estimated from a combination of multiple people (such as a couple or a family). The content specifier 120 specifies video content items to be displayed on the display area (hereinafter also referred to as "target video content items") based on the personal attribute information acquired by the personal attribute information acquirer 110. The display output 130 sets a plurality of screen areas in the display area based on the number of the target video content items specified by the content specifier 120. Using the plurality of screen areas, a plurality of target video content items are displayed at the same time. For example, when the content specifier 120 has specified three video content items as target video content items, the display output 130 sets three screen areas in the display area. The display output 130 allocates the target video content items to the plurality of screen areas set in the display area. Then, the display output 130 outputs the target video content items allocated to the plurality of screen areas.

In the present embodiment, when people have been detected in the target area including the vicinity of the display area, video content items (target video content items) suitable for the attributes of the people are specified. When the target video content items have been specified, a plurality of screen areas are set in the display area based on the number of the target video content items. Then, a corresponding one of the target video content items is displayed in each of the set screen areas. That is, when a plurality of people (a plurality of attributes) have been recognized in the vicinity of the display area for displaying video content, video content items suitable for the people can be displayed at the same time. This is expected to improve the effects of video content. In the present embodiment, the number of screen areas for displaying target video content items are determined according to the number of the target video content items. This enables more efficient use of the display area as compared with the case where the display area is divided into a predetermined number of areas.

Hereinafter, the display control system 1 of the first embodiment will be described in more detail.

Figure 2:
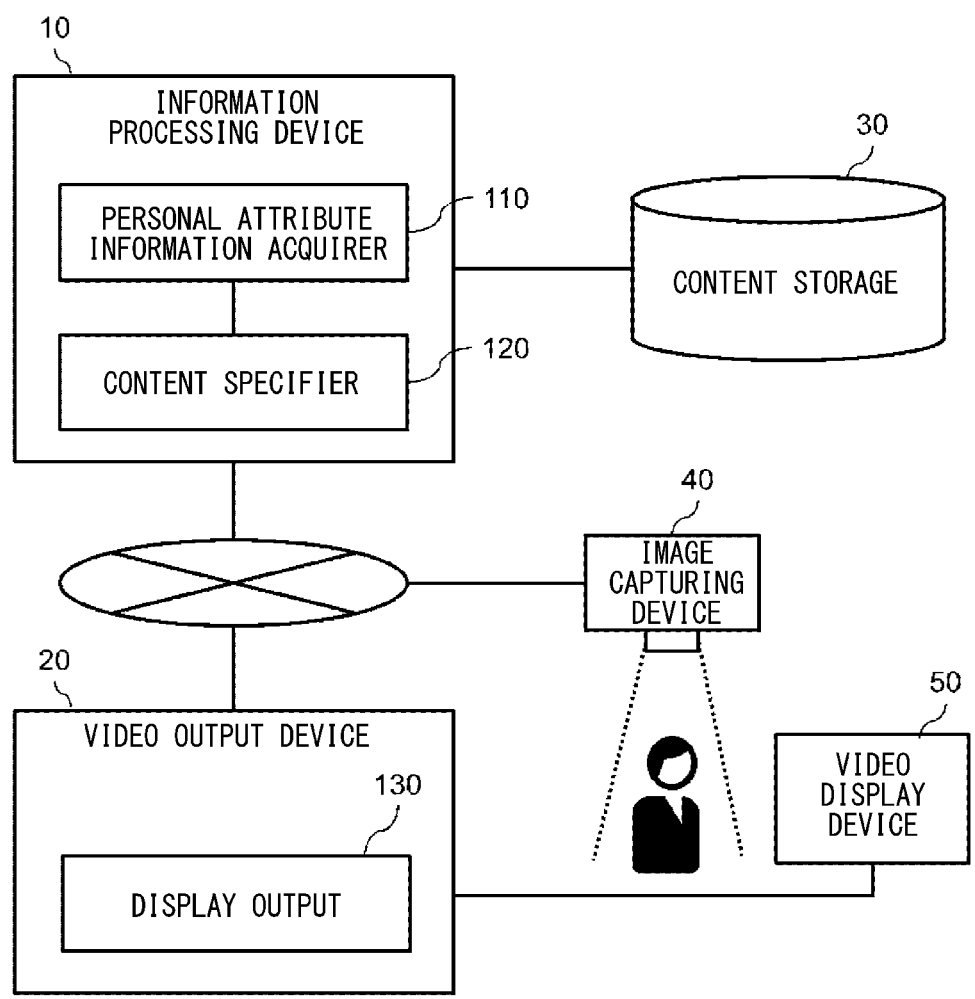
FIG. 2 is a diagram showing an example of a system configuration of the display control system of the first embodiment.

FIG. 2 is a diagram showing an example of a system configuration of the display control system 1 of the first embodiment. In the example of FIG. 2, the display control system 1 includes an information processing device 10, a video output device 20, a content storage 30, an image capturing device 40, and a video display device 50. In the example of FIG. 2, the image capturing device 40 is installed and controlled such that its image capturing range includes a target area including the vicinity of the display area (the video display device 50). The video display device 50 displays video content items in the display area based on video signals transmitted from the video output device 20. The video display device 50 has an arbitrary aspect ratio and resolution. The video display device 50 may be arranged horizontally (landscape) or vertically (portrait). A plurality of video display devices 50 may also form one display area. For example, four video display devices 50 may be combined in 2 columns x 2 rows to form one display area (a multi-screen having a four-sided configuration).

In the example of FIG. 2, the information processing device 10 includes a personal attribute information acquirer 110 and a content specifier 120. The personal attribute information acquirer 110 analyzes an image of the target area including the vicinity of the display area (the video display device 50) generated by the image capturing device 40 and acquires personal attribute information indicating the attributes (e.g., age and gender) of people present in the target area. The content specifier 120 specifies target video content items from video content items stored in the content storage 30 based on the personal attribute information acquired by the personal attribute information acquirer 110. The content storage 30 stores various video content items in association with information indicating at least the attributes of the target groups of the video content items. The content specifier 120 extracts video content items specified as the target video content items from the content storage 30 and transmits them to the video output device 20.

In the example of FIG. 2, the video output device 20 includes a display output 130. The display output 130 sets the number of screen areas in the display area of the video display device 50 based on the number of the target video content items. The display output 130 allocates the target video content items extracted by the content extractor 140 to the plurality of screen areas set in the display area of the video display device 50. The display output 130 outputs the allocated target video content items to the plurality of screen areas.

<Exemplary Hardware Configuration>

Figure 3:
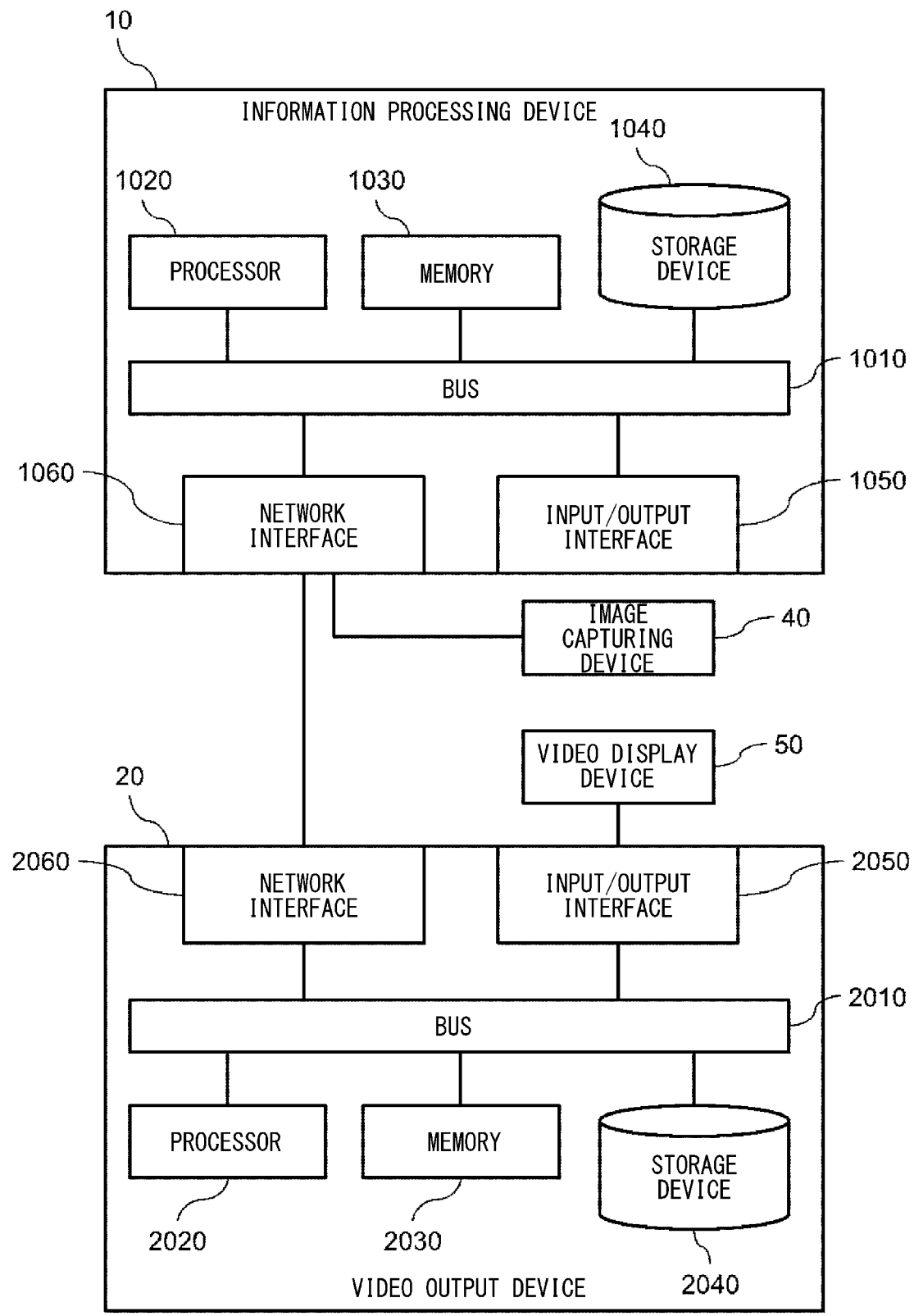
FIG. 3 is a block diagram illustrating a hardware configuration of the display control system.

Each functional component of the display control system 1 may be realized by hardware that realizes the functional component (e.g., a hard-wired electronic circuit) or may be realized by a combination of hardware and software (e.g., a combination of an electronic circuit and a program that controls the electronic circuit). Hereinafter, a case where each functional component of the display control system 1 is realized by a combination of hardware and software will be further described with reference to FIG. 3. FIG. 3 is a block diagram illustrating a hardware configuration of the display control system 1.

The information processing device 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from each other. However, the method of connecting the processors 1020 and the like to each other is not limited to bus connection.

The processor 1020 is a processor realized by a central processing unit (CPU), a graphics processing unit (GPU), or the like.

The memory 1030 is a main storage device realized by a random access memory (RAM) or the like.

The storage device 1040 is an auxiliary storage device realized by a hard disk drive (HDD), a solid state drive (SSD), a memory card, a read only memory (ROM), or the like. The storage device 1040 stores program modules that realize the functions of the display control system 1 (such as the personal attribute information acquirer 110 and the content specifier 120). A function corresponding to each program module is realized by the processor 1020 loading and executing the program module into and from the memory 1030. The storage device 1040 can also be used as the content storage 30 for storing various video content items.

The input/output interface 1050 is an interface for connecting the information processing device 10 to various input/output devices. Input devices (not shown) such as a keyboard or mouse and an output device (not shown) such as a display or a speaker may be connected to the input/output interface 1050.

The network interface 1060 is an interface for connecting the information processing device 10 to a network. This network is, for example, a local area network (LAN) or a wide area network (WAN). The method of connecting the network interface 1060 to the network may be wireless connection or wired connection. In the example of FIG. 3, the information processing device 10 is connected to an external device such as the video output device 20 and the image capturing device 40 via the network interface 1060. The personal attribute information acquirer 110 can communicate with the image capturing device 40 via the network interface 1060 to acquire an image (a frame) in which the vicinity of the video display device 50 is captured. The content specifier 120 can transmit data of the target video content items to the video output device 20 via the network interface 1060.

Similar to the information processing device 10, the video output device 20 includes a bus 2010, a processor 2020, a memory 2030, a storage device 2040, an input/output interface 2050, and a network interface 2060.

The storage device 2040 stores program modules that realize the functions (such as the display output 130) of the display control system 1. A function corresponding to each program module is realized by the processor 2020 loading and executing the program module into and from the memory 2030.

In the example of FIG. 3, the video display device 50 is connected to the video output device 20 via the input/output interface 2050. The video display device 50 may also be connected to the video output device 20 via the network interface 2060.

The hardware configuration of the display control system 1 is not limited to the configuration illustrated in FIG. 3. For example, the processors of the display control system 1 may be integrated into one device (for example, the video output device 20). The image capturing device 40 may be incorporated into the video display device 50. In this case, the information processing device 10 is communicatively connected to the video display device 50 (the image capturing device 40 incorporated in the video display device 50) via the network interface 1060.

<Process Flow>

A process performed by the display control system 1 as illustrated in FIG. 2 will be described. The process performed by the display control system 1 includes a preparatory process for distributing video content to the video output device 20 and a content output process for outputting video content to the video display device 50.

Figure 4:
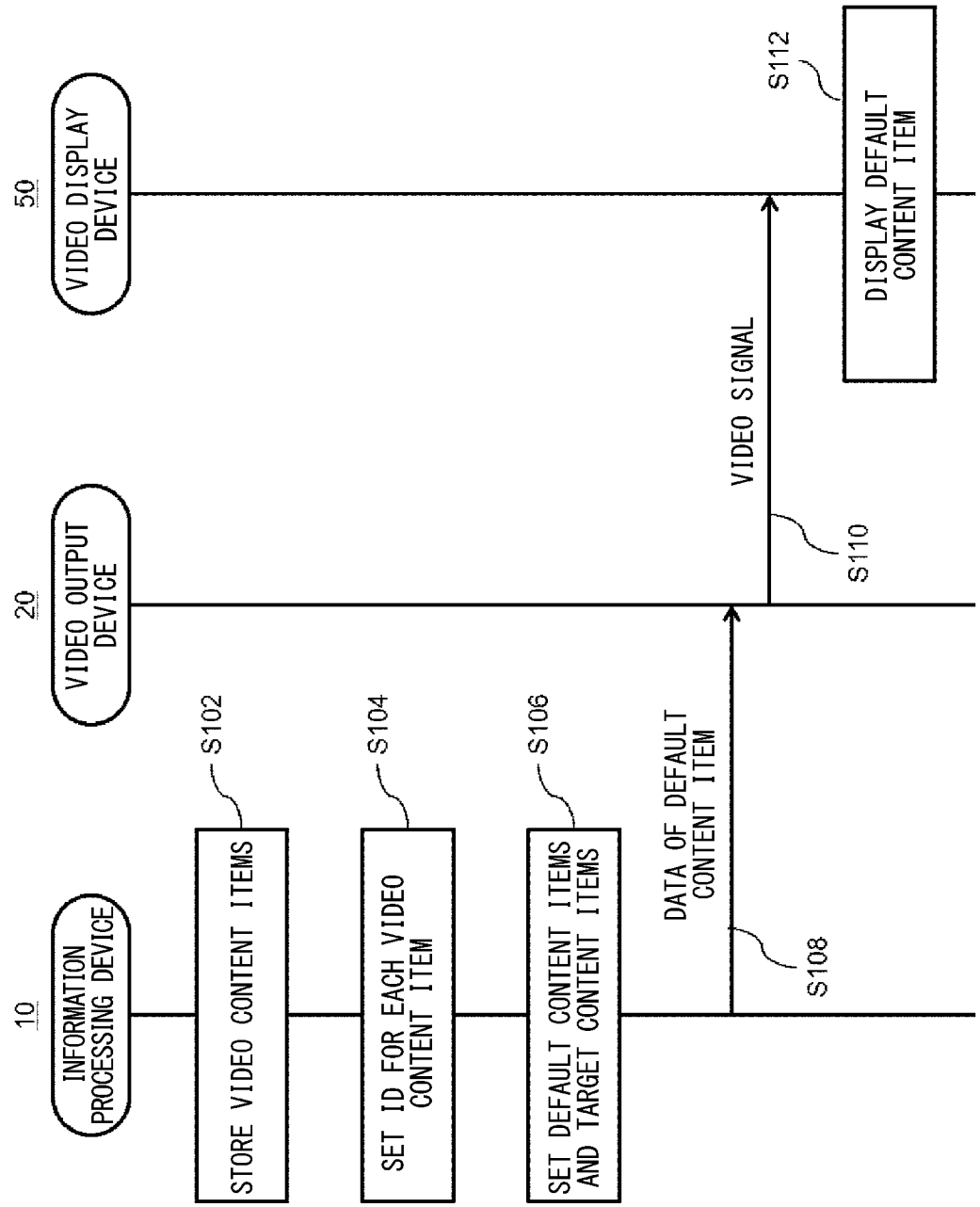
FIG. 4 is a sequence diagram illustrating a flow of a preparatory process performed by the display control system of the first embodiment.

First, the preparatory process will be described with reference to FIG. 4. FIG. 4 is a sequence diagram illustrating a flow of the preparatory process performed by the display control system 1 of the first embodiment.

<<Preparatory Process>>

First, the information processing device 10 acquires data relating to video content items from a video content provider(s) and stores the acquired data in the content storage 30 (S102). At this time, the information processing device 10 automatically sets, for each video content item, information (such as an ID) that uniquely identifies the video content item (S104). The ID set here may be an index, an arbitrary numerical value, or a character string.

Then, the information processing device 10 sets the video content items to be distributed to the video output device 20 as default content items and target content items (S106). Each default content item is a video content item that is output to the video display device 50 when there are no people in the vicinity of the video display device 50 or when the attributes of people present in the vicinity of the video display device 50 cannot be identified for some reason. The target content items are video content items that are output to the video display device 50 according to the attributes of people detected in the vicinity of the video display device 50. The information processing device 10 can specify a default content item or a target content item, for example, based on an input from a user. The information processing device 10 can also set an attribute of people (a target group) which each target content item targets, for example, based on an input from the user. At this time, the information processing device 10 may further receive an input regarding the priority of each target content item and set information indicating the priority in each target content item. By the processing of S106, for example, information as illustrated in FIG. 5 is stored in the content storage 30.

FIG. 5 is a diagram showing an example of information stored in the content storage 30. The content storage 30 illustrated in FIG. 5 stores, for each video content item, an ID automatically allocated to the video content item, actual data of the content, information indicating an attribute of people which is a target of the video content item, the priority of the video content item, and a content flag. Here, the content flag is information indicating the type of the video content item (a default content item or a target content item). In the example of FIG. 5, "1" is set for each default content item and "0" is set for each target content item, although there are no particular limitations.

In the step of acquiring each video content item (the step of processing of S102), information indicating whether the video content item corresponds to a default content item or a target content item may be associated with the video content item in advance. In this case, the above-mentioned process for setting default content items and target content items may not be performed. When the acquired video content item is a target content item, information indicating the attribute and priority of its target group may be further associated with the video content item. In this case, the above-mentioned process for setting the target group and priority may not be performed.

When the setting of the video content items to be distributed to the video output device 20 has been completed, the information processing device 10 extracts data of a default content item from the content storage 30 and transmits the data of the default content item to the video output device 20 (S108).

Upon receiving the data of the default content item from the information processing device 10, the video output device 20 outputs a video signal of the default content item to the video display device 50 (S110). The video display device 50 displays the default content item in the display area based on the signal output from the video output device 20 (S112).

<<Content Output Process>>

Figure 6:
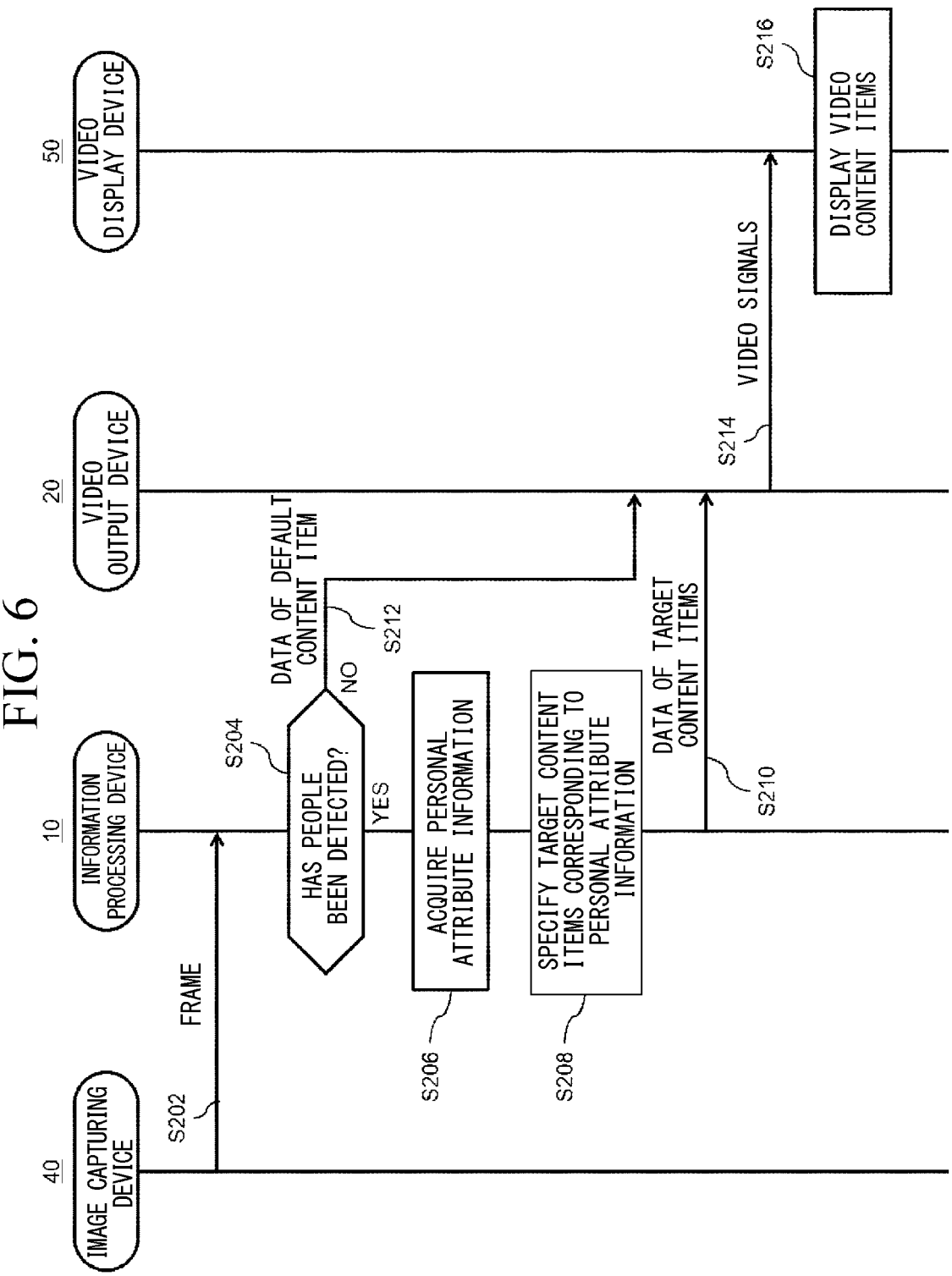
FIG. 6 is a sequence diagram illustrating a flow of the content output process performed by the display control system of the first embodiment.

Next, a content output process will be described with reference to FIG. 6. FIG. 6 is a sequence diagram illustrating a flow of the content output process performed by the display control system 1 of the first embodiment.

The image capturing device 40 is installed and controlled such that it can capture an image of an area including the vicinity of the video display device 50 (for example, an area in front of a display surface of the video display device 50). When the image capturing device 40 has generated an image (a frame) in the vicinity of the video display device 50, the image capturing device 40 transmits the frame to the information processing device 10 (S202).

When the information processing device 10 has received the frame from the image capturing device 40, the personal attribute information acquirer 110 analyzes the frame.

First, the personal attribute information acquirer 110 determines whether or not a person is present in the frame received from the image capturing device 40 (S204). When a person has been detected from the frame (S204: YES), the personal attribute information acquirer 110 estimates an attribute (for example, the age and gender) of the detected person and acquires personal attribute information regarding the person (S206).

Here, for example, using a classifier constructed by machine learning, the personal attribute information acquirer 110 can detect the area of a person from the frame and estimate an attribute such as the age and gender of the detected person. The classifier is a trained model constructed by pre-training using a plurality of images of people of various ages and genders, for example, through deep learning. The estimation result of the attributes of people obtained as an output from the classifier is used as the personal attribute information.

Based on the personal attribute information acquired by analyzing the frame, the content specifier 120 specifies target content items (target video content items) corresponding to the personal attribute information (S208). For example, when information as shown in FIG. 5 is stored in the content storage 30, the content specifier 120 specifies content items to be extracted from content items with content flags set to "0" in the processing of S208. First, the content specifier 120 counts the number of attributes indicated by the acquired personal attribute information. Then, the content specifier 120 determines the number of target content items (target video content items) to be extracted from the content storage 30 based on the counted number of attributes.

For example, a case where first personal attribute information indicating "female in her twenties" and second personal attribute information indicating "male in his forties" are acquired in the processing of S206 will be considered. In this case, the content specifier 120 calculates the number of attributes as "2" based on the attribute (female in her twenties) indicated by the first personal attribute information and the attribute (male in his forties) indicated by the second personal attribute information. Then, the content specifier 120 specifies two target content items as the target content items to be extracted from the content storage 30 based on the number of attributes (the number of people).

Here, the content specifier 120 specifies a target content item for "female in her twenties" and a target content item for "male in his forties" among the target content items stored in the content storage 30 as the target video content items.

A case where first personal attribute information indicating "male in his twenties," second personal attribute information indicating "male in his twenties," and third personal attribute information indicating "male in his thirties" are acquired in the processing of S206 will be considered as another example. In this case, the content specifier 120 counts the number of attributes, excluding a duplication of an attribute. In this example, the attributes of the first personal attribute information and the second personal attribute information are duplicates. In such a case, the content specifier 120 excludes a duplication of the attribute of "male in his twenties." Specifically, the content specifier 120 calculates the number of attributes as "2" rather than "3" based on the attribute (male in his twenties) indicated by the first and second attribute information and the attribute (male in his thirties) indicated by the third personal attribute information. Then, the content specifier 120 specifies two target content items as the target content items to be extracted from the content storage 30 based on the number of attributes. Here, the content specifier 120 specifies a target content item for "male in his twenties" and a target content item for "male in his thirties" among the target content items stored in the content storage 30 as the target video content items.

A plurality of target content items may sometimes be stored in the content storage 30 for each attribute of people. In this case, the content specifier 120 can specify target content items to be extracted from the content storage 30 based on the priority preset for each target content item, the number of times each target content item has been extracted in the past, and the like. Specifically, the content specifier 120 can specify target content items to be extracted in order from a target content item with the highest priority or can preferentially specify a target content item that has been extracted a small number of times in the past.

In another example, the display output 130 may be configured to determine the number of target content items (the number of screen areas) based on the number of people detected from the image (the number of pieces of personal attribute information acquired based on the image).

Then, the content specifier 120 extracts data of the target content items specified in the processing of S208 from the content storage 30 and transmits the extracted data to the video output device 20 (S210).

On the other hand, when no people have been detected from the frame (204: NO), the content specifier 120 extracts data of a default content item from the content storage 30 and transmits the extracted data to the video output device 20 (S212).

Upon receiving the data of the video content items (the default content item or target content items) from the information processing device 10, the video output device 20 awaits completion of reproduction of another video content item currently being output and outputs video signals of the video content items to the video display device 50 (S214). A specific process flow of the video output device 20 will be described later. The video display device 50 displays the default content item or the target content items in the display area based on the video signals output from the video output device 20 (S216).

<<Process Performed by Video Output Device 20>>

Figure 7:
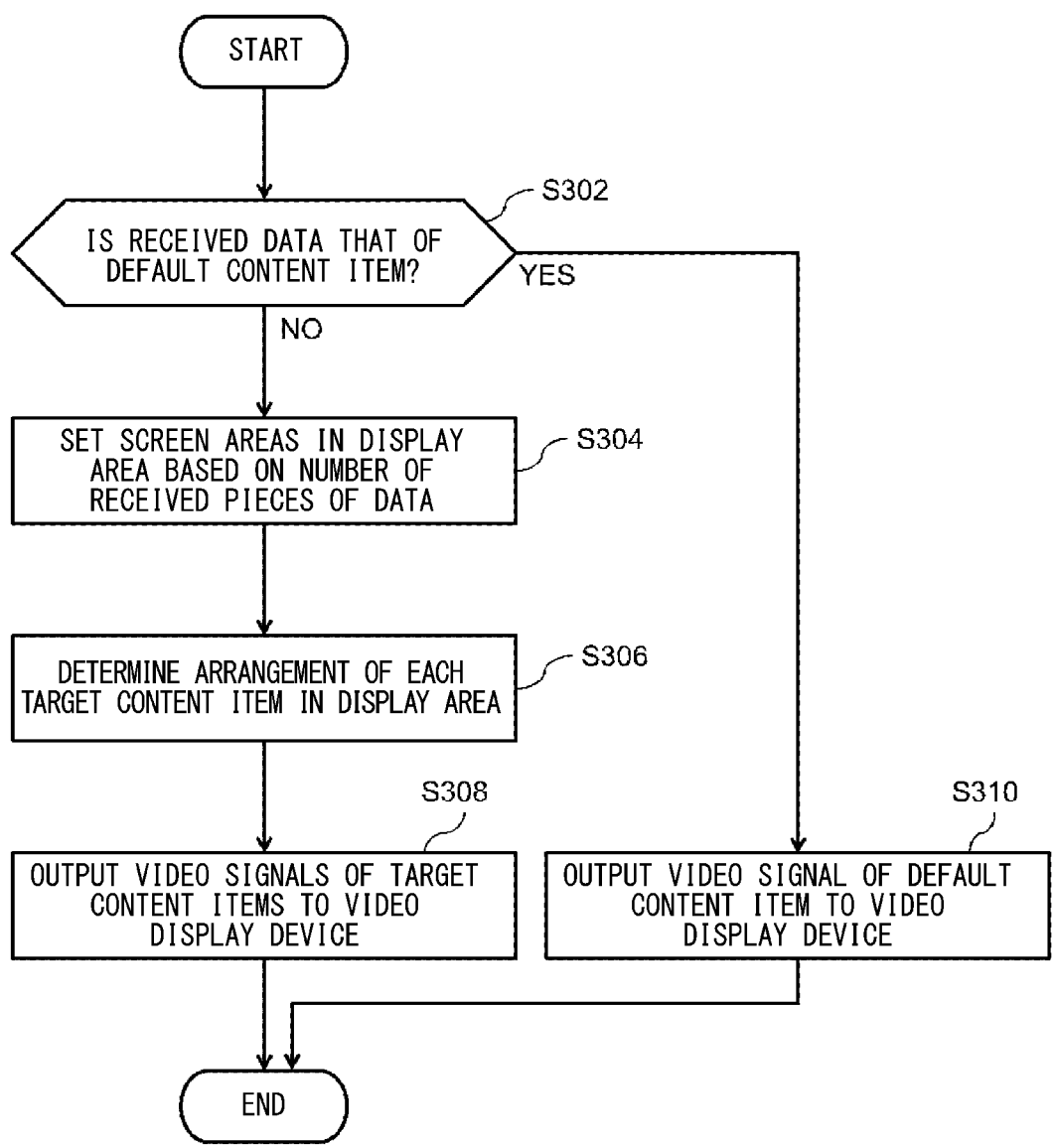
FIG. 7 is a flowchart illustrating a specific process performed by a video output device of the first embodiment.

FIG. 7 is a flowchart illustrating a specific process performed by the video output device 20 of the first embodiment.

When the video output device 20 has received data of a video content item(s) transmitted from the information processing device 10, the display output 130 determines whether or not the received data is data of a default content item (S302). In an example, the display output 130 can determine whether the video content item(s) is a default content item or a target content item(s) by checking the value of a content flag in the data received from the information processing device 10.

When the data received from the information processing device 10 is data of a default content item (S302: YES), the display output 130 outputs a video signal of the default content item to the video display device 50 after reproduction of a video content item currently being output is completed (S310).

On the other hand, when the data acquired from the information processing device 10 is not data of a default content item, that is, the data acquired from the information processing device 10 is data of a target content item(s) (S302: NO), the display output 130 sets screen areas in the display area of the video display device 50 based on the number of acquired pieces of data (S304).

FIG. 8 is a diagram showing an example of setting screen areas by the display output 130. As illustrated in FIG. 8, the display output 130 can determine the layout and the number of screen areas based on the number of target content items specified as the target video content items. For example, when the number of target content items is one, the display output 130 sets the entire display of the video display device 50 as a screen area as shown in FIG. 8(*a*). When the number of target content items is two, the display output 130 sets two screen areas on the display area as shown in FIG. 8(*b*). When the number of target content items is three, the display output 130 sets three screen areas on the display area as shown in FIG. 8(*c*). When the number of target content items is four, the display output 130 sets four screen areas on the display area as shown in FIG. 8(*d*). Thus, the same number of screen areas as the number of target content items acquired from the information processing device 10 are set in the display area of the video display device 50.

The display output 130 may generate a plurality of screen areas by equally dividing the display area according to the number of target content items (for example, FIGS. 8(*b*) and (*d*)) or may divide the display area such that the sizes of screen areas are different (for example, FIG. 8(*c*)). The display output 130 may also set a plurality of screen areas in a so-called picture-in-picture format. For example, the display output 130 may set the entire display area of the video display device 50 as a main screen area and set one or more small sub-screen areas superimposed on the main screen area.

Then, the display output 130 determines the allocation (arrangement) of the target content items to (in) the plurality of screen areas (S306). In other words, the display output 130 determines in which screen area each target content item is to be displayed. At this time, the display output 130 changes (resizes) the display size of each target content item according to the size of a screen area to which the target content item is allocated. Which target content item is arranged in which screen area may be arbitrarily determined.

Then, after reproduction of a video content item currently being output is completed, the display output 130 outputs video signals of the target content items to the video display device 50 according to the arrangement determined in the processing of S306 (S308). When the video content item currently being output is a default content item, the display output 130 may interrupt the output of the video signal of the default content item and start outputting the video signals of the target content items. By doing so, target content items suitable for people detected in the vicinity of the video display device 50 can be displayed on the video display device 50 at a more effective timing.

In the present embodiment, the display output 130 determines the number of screen areas according to a change in the result of processing by the information processing device 10 (a change in the number of people or the number of attributes) as described above. Then, a plurality of target content items extracted according to the number of screen areas are displayed at the same time on the display area of the video display device 50. Thus, when a plurality of people are present in front of the video display device 50, a target content item suitable for each person can be presented while each person is present in the visual range of the video display device 50. This is expected to improve the effects of video content since the possibility that a target person of each video content item can see the video content item is increased. In addition, in the present embodiment, a plurality of screen areas are set in the display area according to the number of target content items to be output to the video display device 50. This can optimize the sizes of areas in which video content items are displayed as compared with the case where the display area is divided into a predetermined number of areas.

Second Embodiment

Figure 9:
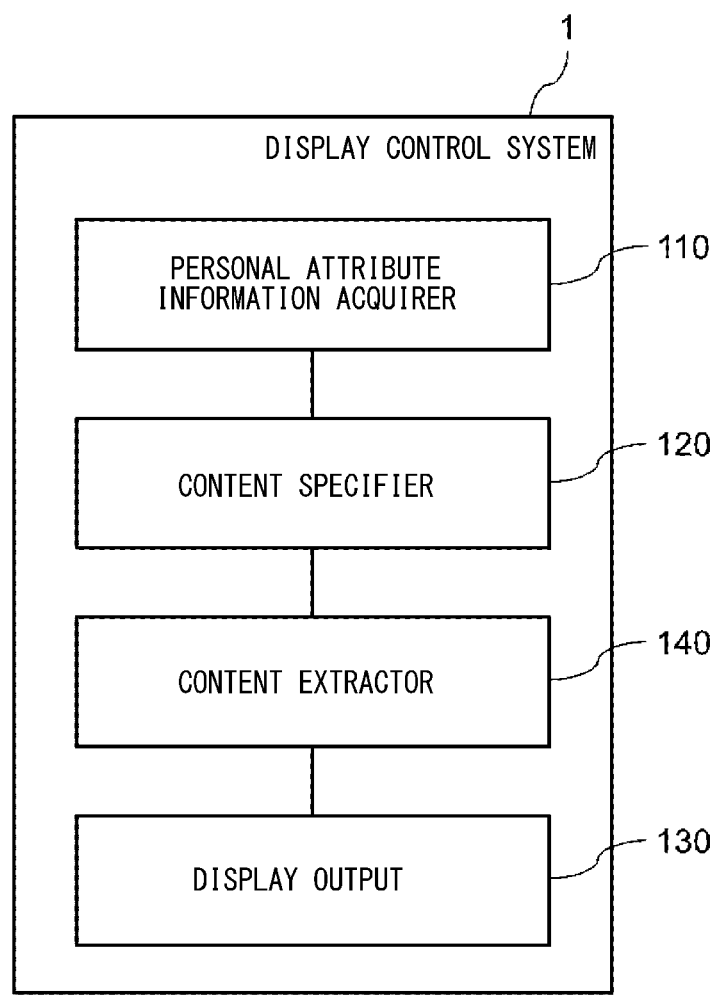
FIG. 9 is a diagram illustrating a functional configuration of a display control system according to a second embodiment.

The present embodiment is the same as the first embodiment except for the points described below.
<Exemplary Functional Configuration>
FIG. 9 is a diagram illustrating a functional configuration of a display control system 1 according to the second embodiment. As shown in FIG. 7, the display control system 1 of the present embodiment further includes a content extractor 140. The content extractor 140 acquires information indicating the result of specifying target video content items by the content specifier 120 (hereinafter also referred to as "content specifying information"). The content extractor 140 specifies corresponding video content items from video content items stored in a predetermined storage (not shown) based on the content specifying information described above. The content extractor 140 extracts video content items specified based on the content specifying information from the storage as target video content items.

Hereinafter, the display control system 1 of the second embodiment will be described in more detail.

Figure 10:
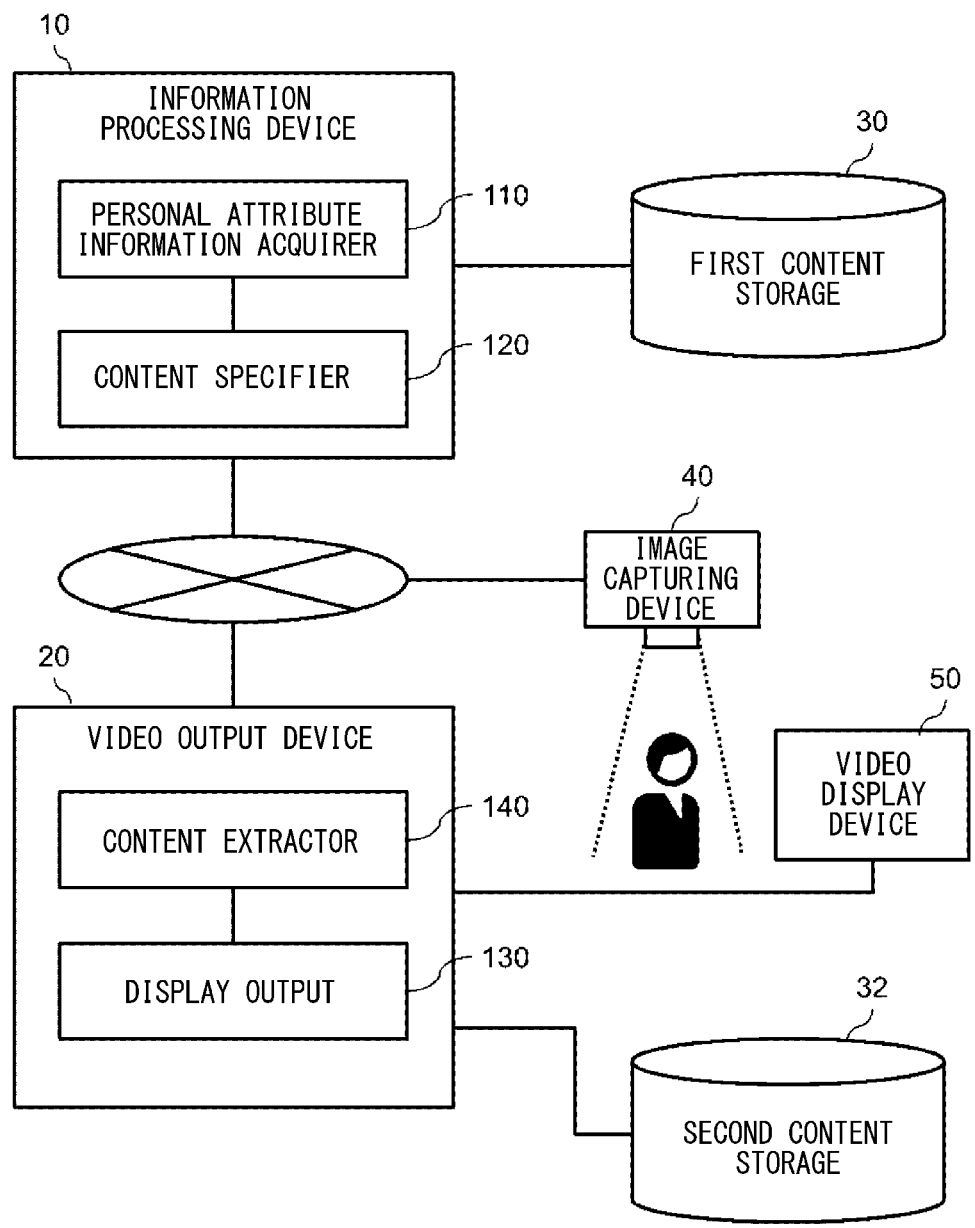
FIG. 10 is a diagram showing an example of a system configuration of the display control system of the second embodiment.

FIG. 10 is a diagram showing an example of a system configuration of the display control system 1 of the second embodiment. In the example of FIG. 10, the display control system 1 includes an information processing device 10, a video output device 20, a content storage 30 connected to the information processing device 10 (hereinafter referred to as a "first content storage 30"), a content storage 32 connected to the video output device 20 (hereinafter referred to as "second content storage 32"), an image capturing device 40, and a video display device 50.

In the example of FIG. 10, the information processing device 10 includes a personal attribute information acquirer 110 and a content specifier 120. The personal attribute information acquirer 110 analyzes an image of the target area including the vicinity of the display area (the video display device 50) generated by the image capturing device 40 and acquires personal attribute information indicating the attributes (e.g., age and gender) of people present in the target area. The content specifier 120 specifies target video content items from video content items stored in the first content storage 30 based on the personal attribute information acquired by the personal attribute information acquirer 110. The first content storage 30 stores various video content items in association with information indicating the target groups of the video content items. The content specifier 120 transmits content specifying information indicating the video content items specified as the target video content items to the video output device 20. The content specifying information is not particularly limited as long as it is information that can uniquely identify each video content item. The content specifying information is, for example, an identifier (ID) set for each video content item.

Figure 11:
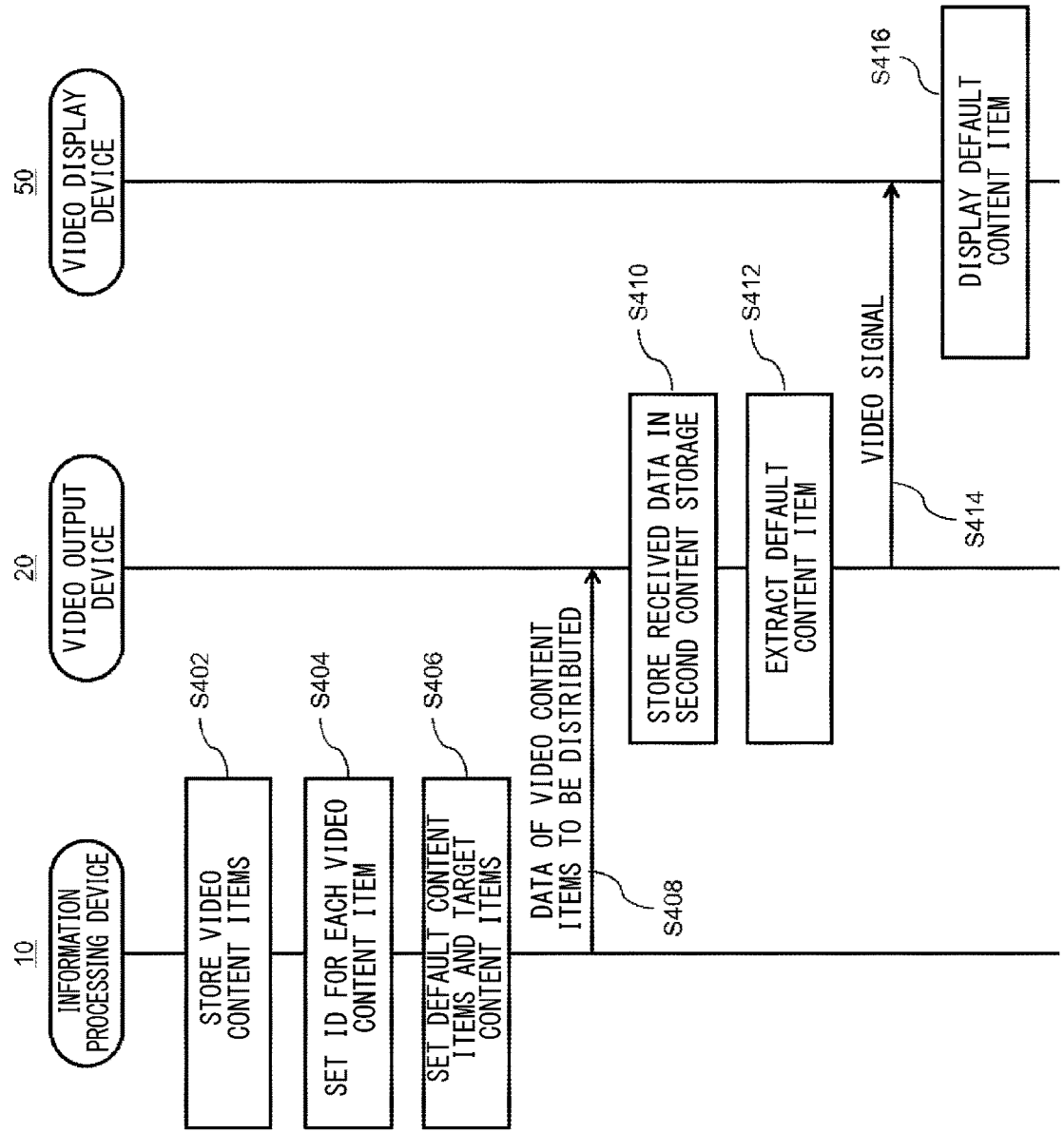
FIG. 11 is a sequence diagram illustrating a flow of a preparatory process performed by the display control system of the second embodiment.

In the example of FIG. 10, the video output device 20 includes a display output 130 and a content extractor 140. The content extractor 140 acquires content specifying information (for example, IDs of the target video content items) transmitted from the information processing device 10. The content extractor 140 extracts video content items (that is, target video content items) specified by the content specifying information acquired from the information processing device 10 from video content items stored in the second content storage 32. The second content storage 32 stores, for example, video content items previously distributed from the information processing device 10 in advance. The display output 130 sets a plurality of screen areas in the display area of the video display device 50 based on the number of the target video content items. The display output 130 allocates the target video content items extracted by the content extractor 140 to the plurality of screen areas set in the display area. Then, the display output 130 outputs the allocated target video content items to the plurality of screen areas.
<Exemplary Hardware Configuration>
The display control system 1 of the present embodiment has the same hardware configuration as that of the first embodiment (e.g., that of FIG. 3). In the present embodiment, the storage device 2040 of the video output device 20 further stores a program module that realizes the content extractor 140 described above. The function of the content extractor 140 is realized by the processor 2020 loading and executing the program module into and from the memory 2030. The storage device 2040 of the video output device 20 can also be used as the second content storage 32.
<Process Flow>
A process performed by the display control system 1 as illustrated in FIG. 10 will be described. The process performed by the display control system 1 includes a preparatory process for distributing video content to the video output device 20 and a content output process for outputting video content to the video display device 50.
<<Preparatory Process>>
First, the preparatory process will be described with reference to FIG. 11. FIG. 11 is a sequence diagram illustrating a flow of the preparatory process performed by the display control system 1 of the second embodiment.

First, the information processing device 10 acquires data relating to video content items from a video content provider (s) and stores the acquired data in the content storage 30 (S402). At this time, the information processing device 10 automatically sets, for each video content item, information (such as an ID) that uniquely identifies the video content item (S404). Then, the information processing device 10 sets the video content items to be distributed to the video output device 20 as default content items and target content items (S406). The process flow from S402 to S406 is the same as the process flow from S102 to S106 in FIG. 4.

Upon completing the setting of the video content items to be distributed to the video output device 20, the information processing device 10 extracts data of the video content items (data of a default content item and target content items) from the content storage 30. Then, the information processing device 10 transmits the extracted data of the video content items to the video output device 20 (S408).

Upon receiving the data of the video content items to be distributed from the information processing device 10, the video output device 20 stores the received data in the second content storage 32 (S410). That is, data of video content items that the information processing device 10 has selected as a distribution target from among the data of the video content items stored in the first content storage 30 is copied to the second content storage 32. Then, the video output device 20 extracts data of a video content item set as a default content item from the data of the video content items stored in the second content storage 32 (S412). Then, the video output device 20 outputs a video signal of the extracted default content item to the video display device 50 (S414). The video display device 50 displays the default content item in the display area based on the signal output from the video output device 20 (S416).

<<Content Output Process>>

Figure 12:
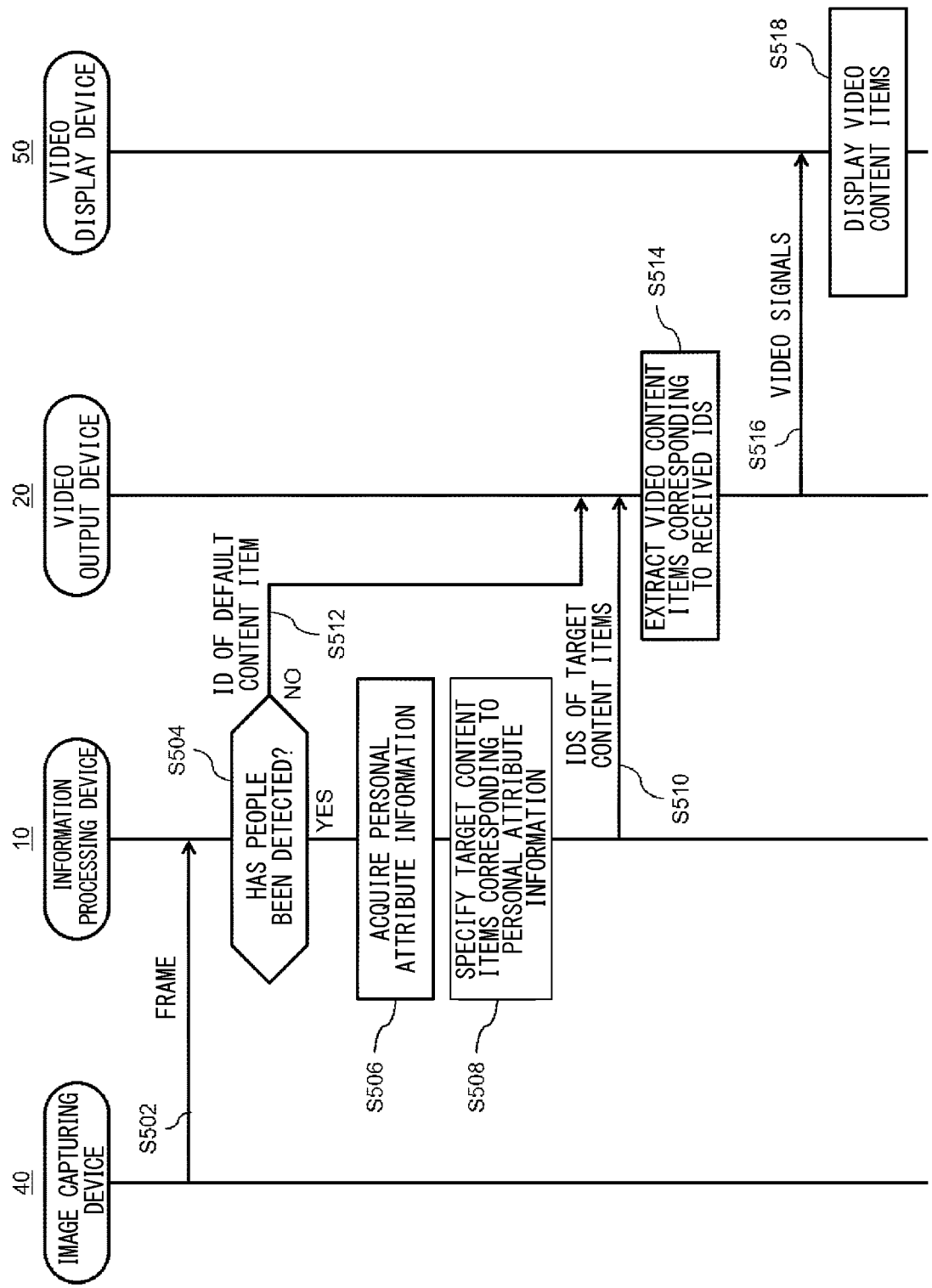
FIG. 12 is a sequence diagram illustrating a flow of a content output process performed by the display control system of the second embodiment.

Next, content output process will be described with reference to FIG. 12. FIG. 12 is a sequence diagram illustrating a flow of the content output process performed by the display control system 1 of the second embodiment.

The image capturing device 40 is installed and controlled such that it can capture an image of an area including the vicinity of the video display device 50 (for example, an area in front of a display surface of the video display device 50). When the image capturing device 40 has generated an image (a frame) in the vicinity of the video display device 50, the image capturing device 40 transmits the frame to the information processing device 10 (S502). This processing is the same as the processing of S202 in FIG. 6 in the first embodiment.

When the information processing device 10 has received the frame from the image capturing device 40, the personal attribute information acquirer 110 analyzes the frame.

First, the personal attribute information acquirer 110 determines whether or not people are present in the frame received from the image capturing device 40 (S504). When people have been detected from the frame (S504: YES), the personal attribute information acquirer 110 estimates an attribute (for example, the age and gender) of the detected people and acquires personal attribute information regarding the people (S506). The, based on the personal attribute information acquired by analyzing the frame, the content specifier 120 specifies target content items (target video content items) corresponding to the personal attribute information (S508). The processing of these steps is the same as the processing of S204 to S208 of FIG. 6 in the first embodiment.

The content specifier 120 extracts IDs of the target content items specified in the processing of S508 from the content storage 30. Then, the content specifier 120 transmits information including the IDs of the target content items (content specifying information) to the video output device 20 (S510).

On the other hand, when no people have been detected from the frame (504: NO), the content specifier 120 extracts an ID of a default content item from the content storage 30. The, the content specifier 120 transmits information including the ID of the default content item to the video output device 20 (S512).

Upon receiving the IDs of the video content items (the default content item or target content items) from the information processing device 10, the video output device 20 extracts video content items corresponding to the IDs from the second content storage 32 (S514). Then, the video output device 20 outputs video signals of the extracted video content items to the video display device 50 (S516). A specific process flow of the video output device 20 will be described later. The video display device 50 displays the default content item or the target content items in the display area based on the video signals output from the video output device 20 (S518).

<<Process Performed by Video Output Device 20>>

Figure 13:
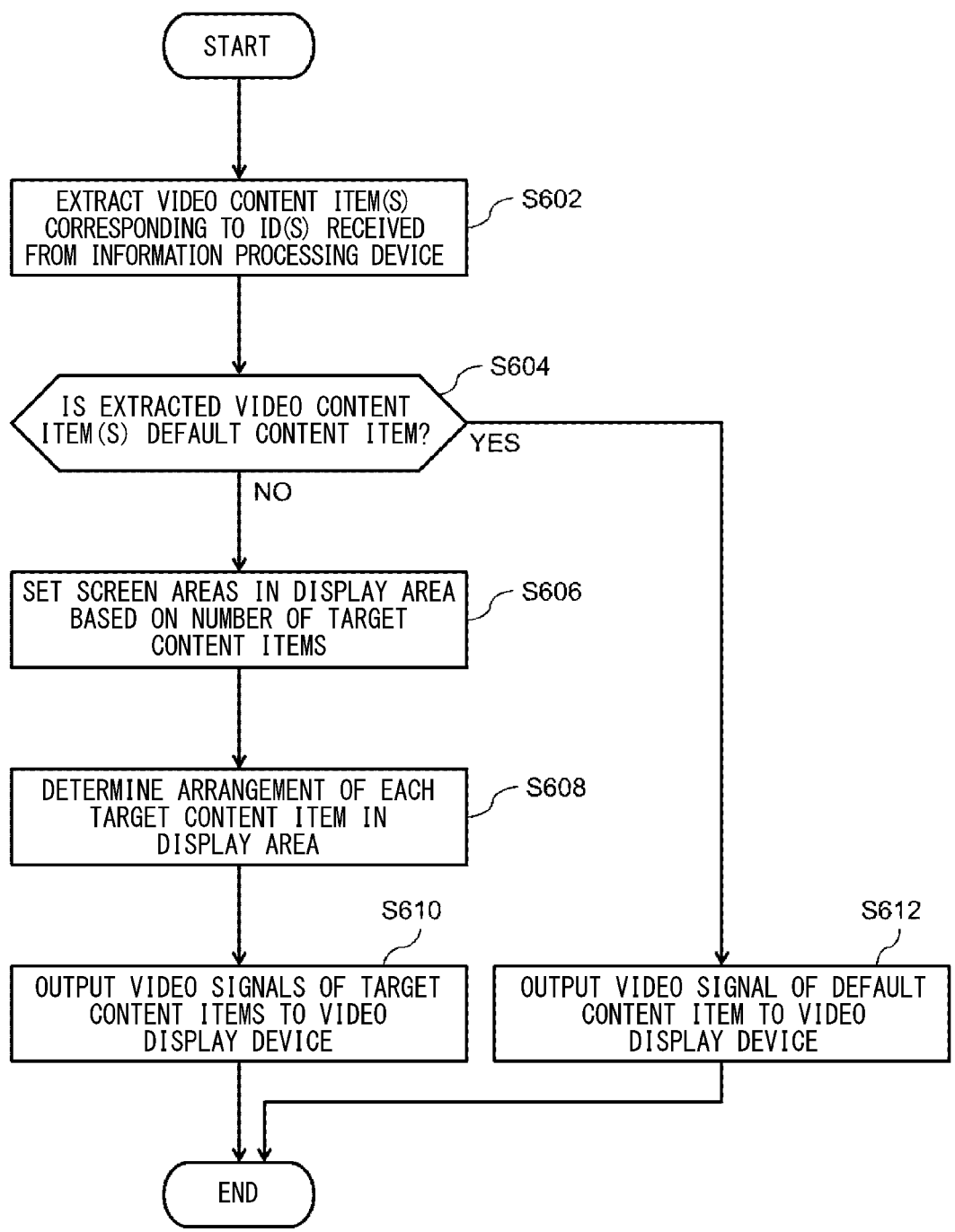
FIG. 13 is a flowchart illustrating a specific process performed by a video output device of the second embodiment.

FIG. 13 is a flowchart illustrating a specific process performed by the video output device 20 of the second embodiment.

When the video output device 20 has received an ID(s) of a video content item(s) transmitted from the information processing device 10, the content extractor 140 extracts a video content item(s) corresponding to the received ID(s) from the second content storage 32 (S602). Then, the display output 130 determines whether or not the video content item(s) extracted from the second content storage 32 is a default content item (S604). In an example, the display output 130 can determine whether or not the video content item(s) is a default content item by checking the value of a content flag that has been set for the video content item(s) corresponding to the received ID(s).

When the video content item(s) extracted based on the ID(s) received from the information processing device 10 is a default content item (S604: YES), the display output 130 outputs a video signal of the default content item to the video display device 50 (S612).

On the other hand, when the video content item(s) extracted based on the ID(s) received from the information processing device 10 is not a default content item, that is, the video content items are target content items (S604: NO), the display output 130 sets screen areas in the display area of the video display device 50 based on the number of the acquired IDs of target content items (S606). For example, when three IDs have been received from the information processing device 10 as the IDs of target content items, the display output 130 sets three screen areas in the display area of the video display device 50. Then, the display output 130 determines the arrangement of each of the target content items acquired from the information processing device 10 on the display area (S608).

In an example, the display output 130 can determine a target content item to be allocated to each screen area based on the correspondence between the priorities of the target content items and the priorities of a plurality of screen areas. In this case, the display output 130 determines the priority for each of the plurality of screen areas. The display output 130 can arbitrarily determine the priority of each screen area. For example, the display output 130 may set a higher priority for a screen area with a larger size. For example, the display output 130 may also set the priority of each screen area according to the arrangement position of the screen area. In a specific example, the display output 130 may set a higher priority for a screen area positioned closer to the upper left corner of the display area and a lower priority for a screen area positioned closer to the lower right corner of the display area. Then, the display output 130 sets a combination of target content items and screen areas based on priority levels of the target content items determined by the priorities of the target content items and priority levels of the screen areas determined by the priorities of the screen areas. This combination based on the priority levels determines a target content item to be allocated to each screen area.

Although the above description illustrates the case where the priority of each target content item is preset, the display output 130 may be configured to automatically set the priority of each target content item based on the result of acquiring personal attribute information by the personal attribute information acquirer 110. For example, it is assumed that the content extractor 140 has extracted a target content item for women and a target content item for men based on IDs received from the information processing device 10 in the processing of S602. In this case, the display output 130 counts the number of people present in the vicinity of the video display device 50 for each attribute (for example, gender or age) based on the result of acquiring personal attribute information by the personal attribute information acquirer 110. Then, the display output 130 calculates the ratios of attributes (the ratio of female and the ratio of male) based on the counting result. As a result, for example, when the ratio of women is higher than the ratio of men, the display output 130 sets the priority of the target content item for women to be higher than the priority of the target content item for men. When the ratio of men is higher than the ratio of women, the display output 130 sets the priority of the target content item for men to be higher than the priority of the target content item for women. That is, the display output 130 sets a higher priority for a target content item that can be expected to be most effective at the timing of outputting the target content item. Flexibly changing the priority according to an actual situation in this way is expected to improve the effects of target content items.

In another example, the display output 130 may determine a target content item to be allocated to each of the plurality of screen areas based on the positions of people detected in the image and the attributes of people. A case where many women are present on the right side of the video display device 50 and many men are present on the left side of the video display device 50 will be considered as a specific example. In this case, upon detecting people based on the image, the personal attribute information acquirer 110 acquires position information of the people (for example, information indicating their positions with reference to the video display device 50) in addition to personal attribute information of the people. Then, the display output 130 allocates a target content item for women to a screen area on the right side and a target content item for men to a screen area on the left side based on the processing result that "there are many women on the right side and many men on the left side." Arranging a target content item at a position where target people can easily see it in this way is expected to improve the effects of the content item.

Then, after reproduction of a video content item currently being output is completed, the display output 130 outputs video signals of the target content items to the video display device 50 according to the arrangement determined in the processing of S608 (S610). When the video content item currently being output is a default content item, the display output 130 may interrupt the output of the video signal of the default content item and start outputting the video signals of the target content items. By doing so, target content items suitable for people detected in the vicinity of the video display device 50 can be displayed on the video display device 50 at a more effective timing.

Such a configuration can achieve the same effects as those of the first embodiment.

Third Embodiment

The present embodiment is the same as the first or second embodiment except for the following points. A configuration based on the second embodiment will be described below.

In the examples described in each of the above embodiments, the display output 130 sets the number of divisions of the display area based on the number of target content items. An upper limit number of screen areas set in the display area (hereinafter also referred to as an "upper display count limit") is preset and the display output 130 may be configured to set a plurality of screen areas within a range up to the upper display count limit as will be described in the present embodiment. According to a configuration described in the present embodiment, the number of content items displayed on the display area at one time is limited. This can prevent each target content item from becoming difficult to see.

<Exemplary Functional Configuration>

Figure 14:
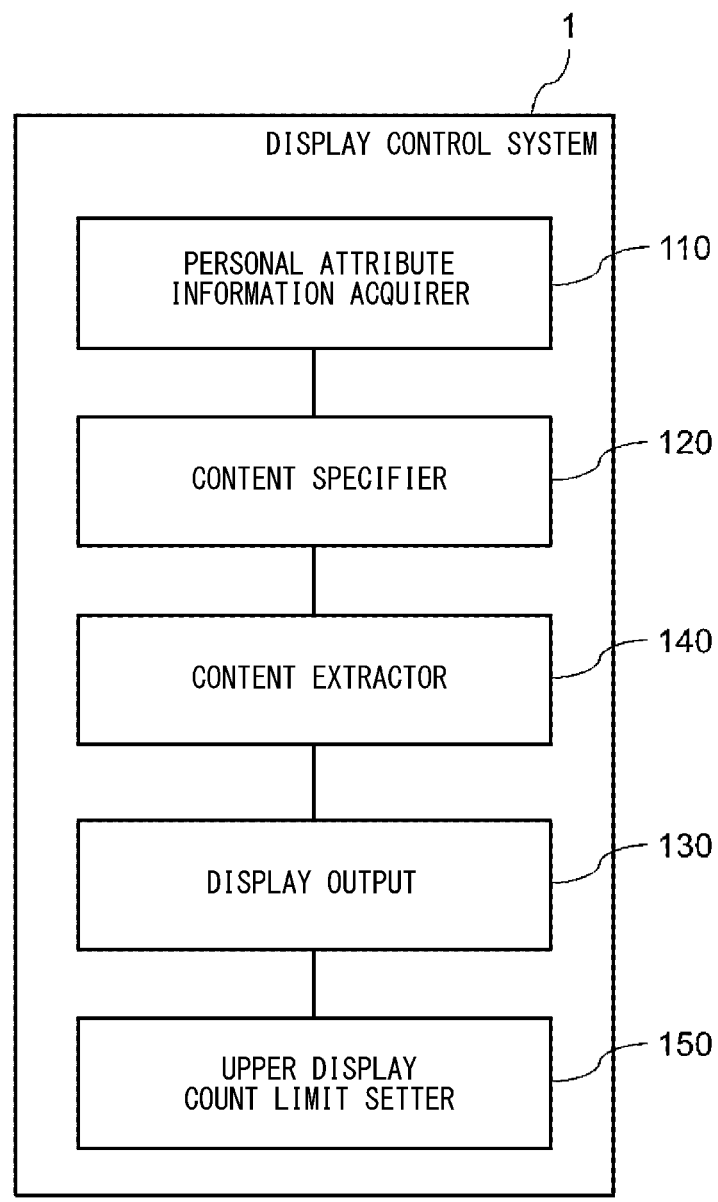
FIG. 14 is a diagram illustrating a functional configuration of a display control system according to a third embodiment.

FIG. 14 is a diagram illustrating a functional configuration of a display control system 1 according to the third embodiment. The display control system 1 of the present embodiment illustrated in FIG. 14 further includes an upper display count limit setter 150 for setting the upper display count limit. For example, the upper display count limit setter 150 receives a user input for designating an upper limit number of screen areas to be set on the display area and sets the upper display count limit based on the user input. The upper display count limit setter 150 may also be configured to automatically set the upper display count limit based on the hardware performance of a device that outputs video content (a device including the display output 130), the size of the display area for displaying video content, or the like. Providing such an upper display count limit setter 150 enables control of the setting of the display area without impairing the processing speed relating to the display of video content and the visibility of video content. Providing the upper display count limit setter 150 enables, for example, flexible settings such as setting of a small upper limit number of screen areas that are to be set at the same time in cases such as when the hardware performance of the video output device 20 is low or when the display area of the video display device 50 is small and setting of a large upper limit number of screen areas that are to be set at the same time in cases such as when the hardware performance of the video output device 20 is high or when the display area of the video display device 50 is large.

Hereinafter, the display control system 1 of the third embodiment will be described in more detail.

Figure 15:
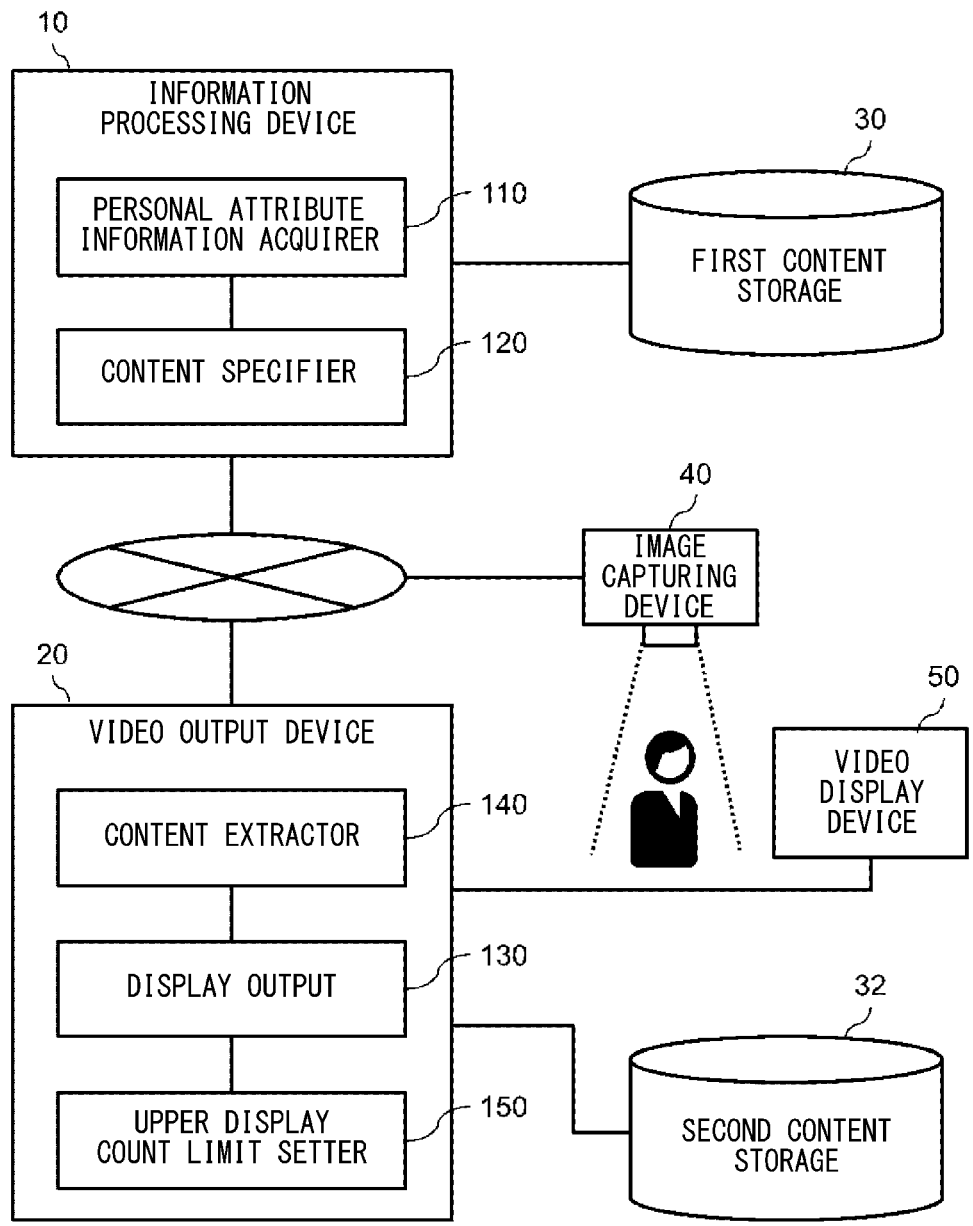
FIG. 15 is a diagram showing an example of a system configuration of the display control system of the third embodiment.

FIG. 15 is a diagram showing an example of a system configuration of the display control system 1 of the third embodiment. The display control system 1 illustrated in FIG. 15 is configured similar to that of FIG. 10 except for the points described below.

In the example of FIG. 15, a video output device 20 further includes an upper display count limit setter 150 in addition to the components of FIG. 10. The upper display count limit setter 150 is configured to set an upper display count limit for the display area of the video display device 50 based on an input from the user. The upper display count limit setter 150 may also be configured to set an upper display count limit for the display area of the video display device 50 based on the hardware performance of the video output device 20 or the size of the display area of the video display device 50.

<Exemplary Hardware Configuration>

The display control system 1 of the present embodiment has the same hardware configuration as that of the first or second embodiment (e.g., that of FIG. 3). In the present embodiment, the storage device 2040 of the video output device 20 further stores a program module that realizes the upper display count limit setter 150 described above. The function of the upper display count limit setter 150 is realized by the processor 2020 loading and executing the program module into and from the memory 2030.

<Process Flow>

Figure 16:
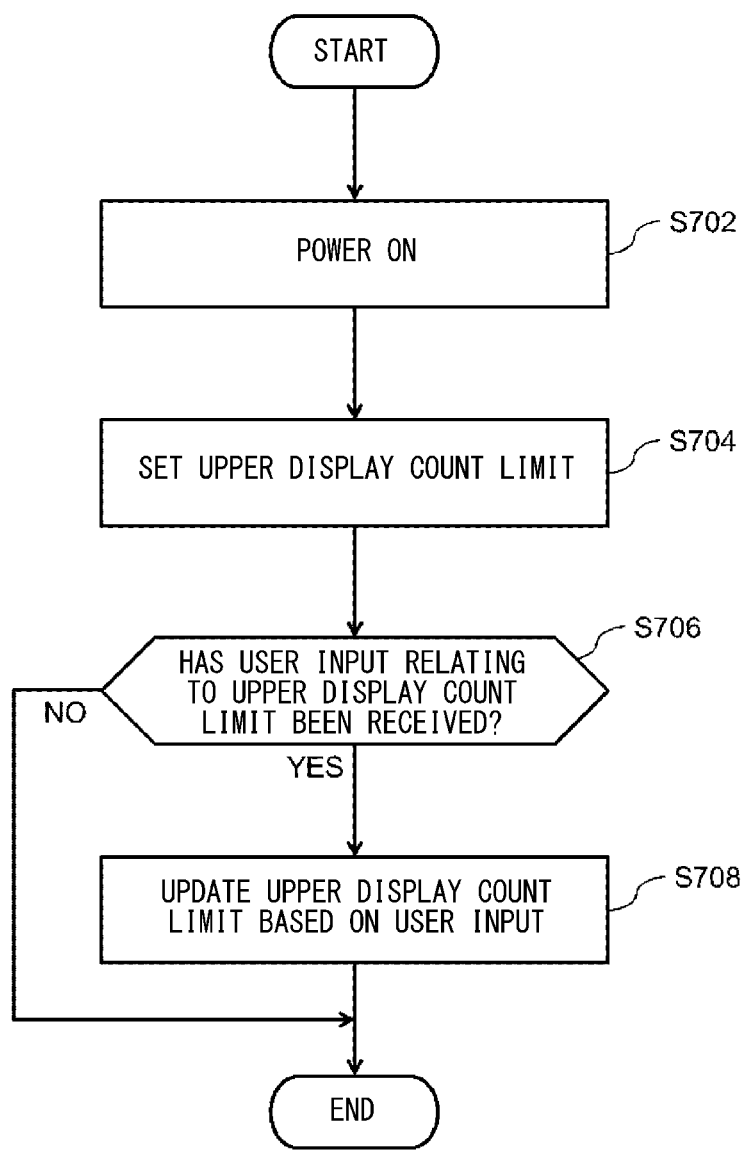
FIG. 16 is a flowchart showing a flow of a process performed by an upper display count limit setter.

First, a process performed by the upper display count limit setter 150 will be described. FIG. 16 is a flowchart showing a flow of the process performed by the upper display count limit setter 150.

When the video output device 20 is powered on, the upper display count limit setter 150 sets an upper display count limit for the display area of the video display device 50 (S702 to S704). For example, a numerical value indicating the upper display count limit is stored in advance in the memory 2030, the storage device 2040, or the like, and the upper display count limit setter 150 reads the numerical value and sets it as the upper display count limit. The upper display count limit setter 150 may also be configured to calculate and set an upper display count limit based on information indicating the processing performance of the video output device 20 or information indicating the size of the display area of the video display device 50 obtained by communicating with the video display device 50 connected to the video output device 20. Upon receiving a user input for designating the upper display count limit (S706: YES), the upper display count limit setter 150 updates the upper display count limit according to the user input (S708).

Figure 17:
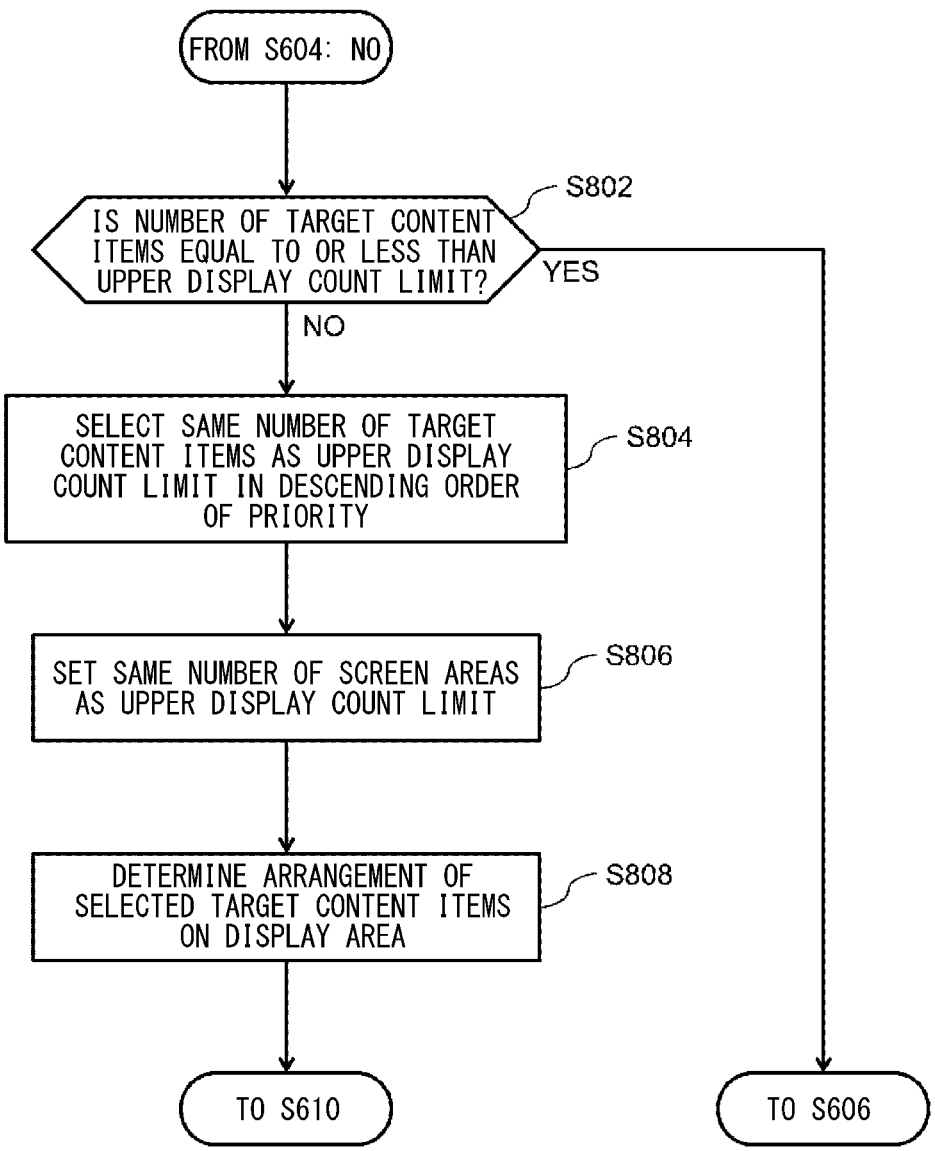
FIG. 17 is a flowchart showing a flow of a process performed by a display output of the third embodiment.

Next, a process performed by the display output 130 will be described. FIG. 17 is a flowchart showing a flow of the process performed by the display output 130 of the third embodiment. A part different from the process shown in FIG. 13 of the second embodiment will be mainly described with reference to FIG. 17.

When video content items extracted based on IDs received from the information processing device 10 are target content items (S604: YES), the display output 130 of the present embodiment determines whether or not the number of the extracted target content items is equal to or less than the upper display count limit (S802).

When the number of the target content items is equal to or less than the upper display count limit (S802: YES), the process moves to S606. Subsequent processing is as described with reference to FIG. 13.

On the other hand, when the number of target content items exceeds the upper display count limit (S802: NO), the display output 130 selects the same number of target content items as the upper display count limit from the extracted target content items in descending order of priority (S804). The display output 130 also sets the same number of screen areas as the upper display count limit in the display area (S806). Then, the display output 130 determines the arrangement (allocation) of each of the target content items selected in S804 on (to) the display area (S808). Then, the display output 130 outputs video signals of the target content items selected in S804 to the video display device 50 according to the arrangement determined in the processing of S808 (S610).

In the present embodiment, the number of target content items displayed on the display area of the video display device 50 is determined within a range up to a preset upper display count limit. This can prevent a problem that a large number of target content items are displayed at the same time in the display area and thus each target content item becomes difficult to see.

Although embodiments of the present invention have been described above with reference to the drawings, the present invention is not to be construed as being limited to them and various changes, improvements, and the like can be made based on the knowledge of those skilled in the art as long as they do not deviate from the gist of the present invention. The plurality of components disclosed in the embodiments can form various inventions through appropriate combinations. For example, some components may be deleted from the components shown in each embodiment or components of different embodiments may be combined as appropriate.

Although a plurality of steps (processing steps) are described in order in the plurality of flowcharts and sequence diagrams used in the above description, the execution order of the steps performed in each embodiment is not limited to the order described. In each embodiment, the order of the steps illustrated can be changed as long as the change is acceptable in terms of content or context. The embodiments described above can also be combined as long as the combination does not cause conflicts in terms of content or context.

Some or all of the embodiments described above may be described as in the following supplements but are not limited to the following.

1. A display control system including:
   a personal attribute information acquirer configured to acquire personal attribute information indicating an attribute of people present in an area including a vicinity of a display area for displaying video content based on a captured image of the area;
   a content specifier configured to specify target video content items, which are video content items to be displayed on the display area, based on the personal attribute information; and
   a display output configured to set a plurality of screen areas in the display area based on the number of the target video content items and allocate the target video content items to the plurality of screen areas and output the target video content items.

2. The display control system according to supplement 1, wherein the content specifier is configured to count the number of attributes indicated by a plurality of pieces of personal attribute information acquired from the image and determine the number of the target video content items based on the number of the attributes.

3. The display control system according to supplement 2, wherein the content specifier is configured to exclude a duplication of an attribute among the attributes indicated by the plurality of pieces of personal attribute information acquired from the image and count the number of the attributes.

4. The display control system according to supplement 2 or 3, wherein the display output is configured to change the number of screen areas according to a change in the number of people or the number of attributes.

5. The display control system according to any one of supplements 1 to 4, wherein the personal attribute information acquirer is configured to acquire the personal attribute information using a classifier constructed by machine learning.

6. The display control system according to any one of supplements 1 to 5, wherein the display output is configured to set the plurality of screen areas within a range up to an upper display count limit preset for the display area.

7. The display control system according to supplement 6, further including an upper display count limit setter configured to set the upper display count limit.

8. The display control system according to supplement 7, wherein the upper display count limit setter is configured to set the upper display count limit based on a hardware performance of the display output or a size of the display area.

9. The display control system according to any one of supplements 1 to 8, further including a content extractor configured to acquire content specifying information indicating a specifying result of the target video content items and extract the target video content items based on the content specifying information.

10. The display control system according to any one of supplements 1 to 9, wherein the display output is configured to determine the target video content items to be allocated to the plurality of screen areas based on correspondence between priorities of the target video content items and priorities of the plurality of screen areas.

11. The display control system according to supplement 10, wherein the display output is configured to determine the priorities of the target video content items based on an acquisition result of the personal attribute information.

12. A display control method including, by a computer:
  acquiring personal attribute information indicating an attribute of people present in an area including a vicinity of a display area for displaying video content based on a captured image of the area;
  specifying target video content items, which are video content items to be displayed on the display area, based on the personal attribute information; and
  setting a plurality of screen areas in the display area based on the number of the target video content items and allocating the target video content items to the plurality of screen areas and outputting the target video content items.

13. The display control method according to supplement 12, including, by the computer, counting the number of attributes indicated by a plurality of pieces of personal attribute information acquired from the image and determining the number of the target video content items based on the number of the attributes.

14. The display control method according to supplement 13, including, by the computer, excluding a duplication of an attribute among the attributes indicated by the plurality of pieces of personal attribute information acquired from the image and counting the number of the attributes.

15. The display control method according to supplement 13 or 14, including, by the computer, changing the number of screen areas according to a change in the number of people or the number of attributes.

16. The display control method according to any one of supplements 12 to 15, including, by the computer, acquiring the personal attribute information using a classifier constructed by machine learning.

17. The display control method according to any one of supplements 12 to 16, including, by the computer, setting the plurality of screen areas within a range up to an upper display count limit preset for the display area.

18. The display control method according to supplement 17, including, by the computer, setting the upper display count limit.

19. The display control method according to supplement 18, including, by the computer, setting the upper display count limit based on a hardware performance of a device that performs display output or a size of the display area.

20. The display control method according to any one of supplements 12 to 19, including, by the computer, acquiring content specifying information indicating a specifying result of the target video content items and extracting the target video content items based on the content specifying information.

21. The display control method according to any one of supplements 12 to 20, including, by the computer, determining the target video content items to be allocated to the plurality of screen areas based on correspondence between priorities of the target video content items and priorities of the plurality of screen areas.

22. The display control method according to supplement 21, including, by the computer, determining the priorities of the target video content items based on an acquisition result of the personal attribute information.

23. A program for causing a computer to function as:
  a personal attribute information acquirer configured to acquire personal attribute information indicating an attribute of people present in an area including a vicinity of a display area for displaying video content based on a captured image of the area;
  a content specifier configured to specify target video content items, which are video content items to be displayed on the display area, based on the personal attribute information; and
  a display output configured to set a plurality of screen areas in the display area based on the number of the target video content items and allocate the target video content items to the plurality of screen areas and output the target video content items.

24. The program according to supplement 23, wherein the content specifier is configured to count the number of attributes indicated by a plurality of pieces of personal attribute information acquired from the image and determine the number of the target video content items based on the number of the attributes.

25. The program according to supplement 24, wherein the content specifier is configured to exclude a duplication of an attribute among the attributes indicated by the plurality of pieces of personal attribute information acquired from the image and count the number of the attributes.

26. The program according to supplement 24 or 25, wherein the display output is configured to change the number of screen areas according to a change in the number of people or the number of attributes.

27. The program according to any one of supplements 23 to 26, wherein the personal attribute information acquirer is configured to acquire the personal attribute information using a classifier constructed by machine learning.

28. The program according to any one of supplements 23 to 27, wherein the display output is configured to set the plurality of screen areas within a range up to an upper display count limit preset for the display area.

29. The program according to supplement 28, causing the computer to further function as an upper display count limit setter configured to set the upper display count limit.

30. The program according to supplement 29, wherein the upper display count limit setter is configured to set the upper display count limit based on a hardware performance of the display output or a size of the display area.

31. The program according to any one of supplements 23 to 30, further causing the computer to function as a content extractor configured to acquire content specifying information indicating a specifying result of the target video content items and extract the target video content items based on the content specifying information.

32. The program according to any one of supplements 23 to 31, wherein the display output is configured to determine the target video content items to be allocated to the plurality of screen areas based on correspondence between priorities of the target video content items and priorities of the plurality of screen areas.

33. The program according to supplement 32, wherein the display output is configured to determine the priorities of the target video content items based on an acquisition result of the personal attribute information.

REFERENCE SIGNS LIST

1 Display control system
10 Information processing device
1010 Bus
1020 Processor
1030 Memory
1040 Storage device
1050 Input/output interface
1060 Network interface
110 Personal attribute information acquirer
120 Content specifier
130 Display output
140 Content extractor
150 Upper display count limit setter
20 Video output device
2010 Bus
2020 Processor
2030 Memory
2040 Storage device
2050 Input/output interface
2060 Network interface
30 Content storage (first content storage)
32 Second content storage
40 Image capturing device
50 Video display device

The invention claimed is:

1. A display control system comprising:
a memory storing instructions;
a processor executing the instructions and configured to:
acquire personal attribute information indicating an attribute of people present in an area including a vicinity of a display area for displaying video content based on a captured image of the area;
specify target video content items, which are video content items to be displayed on the display area, based on the personal attribute information; and
a display output configured to: set a plurality of screen areas in the display area based on the number of target video content items and allocate the target video content items to the plurality of screen areas and output the target video content items,
determine the target video content items to be allocated to the plurality of screen areas based on correspondence between priorities of the target video content items and priorities of the plurality of screen areas;
count the number of people for each attribute; and
determine, based on a ratio of each attribute, the priorities of the target video content items based on an acquisition result of the personal attribute information;
wherein the entire display area is occupied by the screen area of the number of target video content items.

2. The display control system according to claim 1, wherein the processor is further configured to
exclude a duplication of an attribute among the attributes indicated by the plurality of pieces of personal attribute information acquired from the image to count the number of attributes, and
determine the number of the target video content items based on the number of the attributes, and
the display output is configured to allocate, based on a distribution of positions of two or more people for each attribute, the target video content items to the plurality of screen areas.

3. The display control system according to claim 2, wherein the display output is configured to change the number of screen areas according to a change in the number of people or the number of attributes.

4. The display control system according to claim 1, wherein the processor is configured to acquire the personal attribute information using a classifier constructed by machine learning.

5. The display control system according to claim 1, wherein the display output is configured to set the plurality of screen areas within a range up to an upper display count limit preset for the display area, and
the display output is configured to
select the target video content within the range up to the upper display count limit based on priority of each of the target video content items when the number of the target video content items is over the upper display count limit, and
allocate and output the selected target video content on each of the plurality of screen areas.

6. The display control system according to claim 5, wherein the processor is further configured to set the upper display count limit.

7. The display control system according to claim 6, wherein the processor is further configured to set the upper display count limit based on a hardware performance of the display output or a size of the display area.

8. The display control system according to claim 1, wherein the processor is further configured to acquire content specifying information indicating a specifying result of the target video content items and extract the target video content items based on the content specifying information.

9. The display control system according to claim 1, wherein an entire display of a video display device is the entire screen area, and
wherein a number of divisions of the display area based on a number of target content items occupy the entire screen area of the display device.

10. A display control method implemented by a computer, comprising:
acquiring personal attribute information indicating an attribute of people present in an area including a vicinity of a display area for displaying video content based on a captured image of the area;
specifying target video content items, which are video content items to be displayed on the display area, based on the personal attribute information;

setting a plurality of screen areas in the display area based on the number of the target video content items and allocating the target video content items to the plurality of screen areas and outputting the target video content items, determining the target video content items to be allocated to the plurality of screen areas based on correspondence between priorities of the target video content items and priorities of the plurality of screen areas;

counting the number of people for each attribute; and determining, based on a ratio of each attribute, the priorities of the target video content items based on an acquisition result of the personal attribute information;

wherein the entire display area is occupied by the screen area of the number of target video content items.

11. The display control method according to claim 10, further comprising:

excluding a duplication of an attribute among the attributes indicated by the plurality of pieces of personal attribute information acquired from the image to count the number of attributes; and determining the number of the target video content items based on the number of the attributes, and the display output is configured to allocate, based on a distribution of positions of two or more people for each attribute, the target video content items to the plurality of screen areas.

12. The display control method according to claim 10, wherein the display output is configured to set the plurality of screen areas within a range up to an upper display count limit preset for the display area, and the display output is configured to select the target video content within the range up to the upper display count limit based on priority of each of the target video content items when the number of the target video content items is over the upper display count limit, and allocate and output the selected target video content on each of the plurality of screen areas.

13. The display control method according to claim 10, wherein the display output is configured to count the number of people for each attribute, and determine, based on a ratio of each attribute, the priorities of the target video content items based on an acquisition result of the personal attribute information.

14. A non-transitory computer readable recording medium storing a program for causing a computer to function to:

acquire personal attribute information indicating an attribute of people present in an area including a vicinity of a display area for displaying video content based on a captured image of the area;

specify target video content items, which are video content items to be displayed on the display area, based on the personal attribute information;

provide a display output configured to set a plurality of screen areas in the display area based on the number of the target video content items and allocate the target video content items to the plurality of screen areas and output the target video content items, determine the target video content items to be allocated to the plurality of screen areas based on correspondence between priorities of the target video content items and priorities of the plurality of screen areas;

count the number of people for each attribute; and determine, based on a ratio of each attribute, the priorities of the target video content items based on an acquisition result of the personal attribute information;

wherein the entire display area is occupied by the screen area of the number of target video content items.

15. The non-transitory computer readable recording medium according to claim 14, further comprising:

excluding a duplication of an attribute among the attributes indicated by the plurality of pieces of personal attribute information acquired from the image to count the number of attributes; and determining the number of the target video content items based on the number of the attributes, and the display output is configured to allocate, based on a distribution of positions of two or more people for each attribute, the target video content items to the plurality of screen areas.

16. The non-transitory computer readable recording medium according to claim 14, wherein the display output is configured to set the plurality of screen areas within a range up to an upper display count limit preset for the display area, and the display output is configured to select the target video content within the range up to the upper display count limit based on priority of each of the target video content items when the number of the target video content items is over the upper display count limit, and allocate and output the selected target video content on each of the plurality of screen areas.

17. The non-transitory computer readable recording medium according to claim 14, wherein the display output is configured to count the number of people for each attribute, and determine, based on a ratio of each attribute, the priorities of the target video content items based on an acquisition result of the personal attribute information.

* * * * *